US009907091B2

(12) United States Patent
Suzuki

(10) Patent No.: US 9,907,091 B2
(45) Date of Patent: Feb. 27, 2018

(54) COMMUNICATION DEVICE, CONTROL METHOD, AND PROGRAM

(71) Applicant: FeliCa Networks, Inc., Tokyo (JP)

(72) Inventor: Takashi Suzuki, Kanagawa (JP)

(73) Assignee: FeliCa Networks, Inc. (JP)

( * ) Notice: Subject to any disclaimer, the term of this patent is extended or adjusted under 35 U.S.C. 154(b) by 0 days.

(21) Appl. No.: 14/573,271

(22) Filed: Dec. 17, 2014

(65) Prior Publication Data

US 2015/0099465 A1 Apr. 9, 2015

Related U.S. Application Data

(63) Continuation of application No. 13/564,913, filed on Aug. 2, 2012, now Pat. No. 8,942,625.

(30) Foreign Application Priority Data

Aug. 12, 2011 (JP) ................................ 2011-176492

(51) Int. Cl.
*H04W 74/06* (2009.01)
*H04B 5/00* (2006.01)
*H04W 4/00* (2018.01)
*H04W 4/02* (2018.01)

(52) U.S. Cl.
CPC ............. *H04W 74/06* (2013.01); *H04B 5/00* (2013.01); *H04B 5/0031* (2013.01); *H04W 4/003* (2013.01); *H04W 4/008* (2013.01); *H04W 4/028* (2013.01)

(58) Field of Classification Search
CPC ...... H04B 5/02; H04B 5/0062; H04B 5/0068; H04B 5/0031; H04B 5/0037; H04B 13/005; H04B 5/00; H04B 5/0012; H04B 5/0018; H04B 5/0075; H04B 5/0081; H04W 8/005; H04W 4/008; H04W 48/16
USPC .......... 455/41.1, 41.2, 3.06, 115.1; 340/10.1, 340/10.4, 10.5
See application file for complete search history.

(56) References Cited

U.S. PATENT DOCUMENTS

| | | | | |
|---|---|---|---|---|
| 7,366,901 | B2 * | 4/2008 | Hapamas et al. | 713/168 |
| 7,375,616 | B2 * | 5/2008 | Rowse et al. | 340/10.1 |
| 8,564,408 | B2 * | 10/2013 | Rowse et al. | 340/10.1 |
| 2003/0093459 | A1 * | 5/2003 | Dowling | H04L 29/06 709/201 |

(Continued)

FOREIGN PATENT DOCUMENTS

| | | | |
|---|---|---|---|
| JP | 2011-049778 | A | 3/2011 |
| WO | 2010-115770 | A1 | 10/2010 |

OTHER PUBLICATIONS

European Search Report from EP Application No. 12174086, dated Nov. 10, 2014.

*Primary Examiner* — Ankur Jain
*Assistant Examiner* — Zhitong Chen
(74) *Attorney, Agent, or Firm* — Lerner, David, Littenberg, Krumholz & Mentlik, LLP

(57) ABSTRACT

A communication device, includes targets that each execute predetermined processing; and a front end that selects, from the targets, a confirmed target with which an external device is to communicate and that performs near-field communication with the external device. During transmission of a command for selecting at least one candidate of the confirmed target, the front end selects a predetermined one of the targets once every two times as a transmission destination of the command.

16 Claims, 21 Drawing Sheets

(56) References Cited

U.S. PATENT DOCUMENTS

| | | | | |
|---|---|---|---|---|
| 2005/0141465 | A1* | 6/2005 | Kato et al. | 370/337 |
| 2006/0094402 | A1* | 5/2006 | Kim | 455/411 |
| 2007/0001853 | A1* | 1/2007 | Otranen | 340/572.1 |
| 2007/0106467 | A1* | 5/2007 | Sumizawa et al. | 701/209 |
| 2007/0225018 | A1* | 9/2007 | Cho | 455/456.1 |
| 2008/0009309 | A1* | 1/2008 | Gha | 455/550.1 |
| 2009/0191812 | A1* | 7/2009 | Teruyama | G06K 7/0008 455/41.1 |
| 2009/0247077 | A1* | 10/2009 | Sklovsky | G06F 9/445 455/41.1 |
| 2009/0303015 | A1* | 12/2009 | Teruyama | G06Q 20/32 340/10.2 |
| 2010/0178866 | A1* | 7/2010 | Jalkanen | 455/41.1 |
| 2011/0053501 | A1 | 3/2011 | Teruyama | |
| 2011/0119491 | A1* | 5/2011 | Nocera | 713/170 |
| 2012/0032632 | A1* | 2/2012 | Soar | 320/108 |
| 2012/0178365 | A1* | 7/2012 | Katz et al. | 455/41.1 |
| 2012/0178366 | A1* | 7/2012 | Levy | G06K 7/10237 455/41.1 |
| 2012/0196529 | A1* | 8/2012 | Huomo | G06Q 20/045 455/41.1 |
| 2012/0297204 | A1* | 11/2012 | Buer | 713/193 |
| 2012/0309302 | A1* | 12/2012 | Buhot | H04B 5/00 455/41.1 |
| 2012/0309315 | A1* | 12/2012 | Sakata et al. | 455/41.2 |
| 2013/0060959 | A1* | 3/2013 | Taveau et al. | 709/232 |
| 2013/0137371 | A1* | 5/2013 | Haverinen | 455/41.1 |
| 2013/0299596 | A1* | 11/2013 | Choi et al. | 235/492 |
| 2015/0038077 | A1* | 2/2015 | Suzuki et al. | 455/41.1 |

* cited by examiner

FIG. 2

| SC | RC | TSN | AVAILABLE TARGET | | | REMARK |
|---|---|---|---|---|---|---|
| | | | ESE | UICC | P2P | |
| FFFF | 0 | 0 | ○ | ○ | ○ | |
| OTHER | 0 | 0 | ○ | ○ | × | |
| FFFF | 0 | 1 | ○ | ○ | ○ | |
| OTHER | 0 | 1 | ○ | ○ | × | |
| FFFF | 0 | 3/7/F | ○ | ○ | ○ | FORUM TECHNOLOGY DETECTION |
| OTHER | 0 | 3/7/F | ○ | ○ | × | |
| FFFF | 1 | 0 | ○ | ○ | × | |
| OTHER | 1 | 0 | ○ | ○ | × | |
| FFFF | 1 | 1 | ○ | ○ | × | |
| OTHER | 1 | 1 | ○ | ○ | × | |
| FFFF | 1 | 3/7/F | ○ | ○ | × | |
| OTHER | 1 | 3/7/F | ○ | ○ | × | |
| FFFF | 2 | 0 | ○ | ○ | ○ | |
| OTHER | 2 | 0 | ○ | ○ | × | |
| FFFF | 2 | 1 | ○ | ○ | ○ | |
| OTHER | 2 | 1 | ○ | ○ | × | |
| FFFF | 2 | 3/7/F | ○ | ○ | ○ | |
| OTHER | 2 | 3/7/F | ○ | ○ | × | |
| FFFF | OTHER | 0 | ○ | ○ | ○ | |
| OTHER | OTHER | 0 | ○ | ○ | × | |
| FFFF | OTHER | 1 | ○ | ○ | ○ | |
| OTHER | OTHER | 1 | ○ | ○ | × | |
| FFFF | OTHER | 3/7/F | ○ | ○ | ○ | |
| OTHER | OTHER | 3/7/F | ○ | ○ | × | |

HATCHED CONDITIONS INDICATE THAT NO RESPONSES CAN BE SENT BACK AT ONCE BECAUSE OF INSUFFICIENT NUMBER OF SLOTS EVEN IF CLF HAS MULTI-RESPONSE FUNCTION

POLLING PARAMETER
SC = System Code
RC = Reguest Code
TSN = Time Slot Number

GENERAL FLOW: P2P → ESE → P2P → UICC → P2P

FLOW DURING BROADCAST: P2P → ESE → P2P → ~~UICC~~ ESE → P2P → UICC → P2P → ~~ESE~~ UICC → P2P

ORDER OF SELECTION OF TARGET CANDIDATES: P2P → ESE → P2P → UICC → P2P → T3T → P2P → ...

COMMUNICATION DEVICE, CONTROL METHOD, AND PROGRAM

CROSS-REFERENCE TO RELATED APPLICATIONS

The present application is a continuation of U.S. patent application Ser. No. 13/564,913, filed Aug. 2, 2012, which claims priority from Japanese Patent No. JP 2011-176492, filed in the Japanese Patent Office on Aug. 12, 2011 the disclosure of which are incorporated herein by reference.

BACKGROUND

The present technology relates to communication devices, control methods, and programs. In particular, the present technology relates to a communication device, a control method, and a program that are capable of quickly establishing a communication.

NFC (near-field communication) standards have been available for wireless communication. In NFC devices that support the NFC standards, each terminal may have therein multiple communication targets (hereinafter may be referred to as "targets").

The present applicant has previously proposed an NFC device including multiple secure elements that serve as targets and a front end that is shared by the secure elements and that performs near-field communication with an external device, such as a reader. During startup, the front end in the NFC device allots different time slots for communications to the multiple secure elements (see, for example, Japanese Unexamined Patent Application Publication No. 2011-49778).

As illustrated in FIG. 1, two systems, i.e., a single-response system and a multi-response system, are available for near-field communication performed between a reader and a contactless wireless chip (a CLE (contactless front end), which may also be referred to as a "front end" hereinafter) for performing near field wireless communication.

In the single-response system, since the front end sends back a single polling response in response to polling from the reader, the reader performs processing on a target corresponding to the polling response. Accordingly, the single-response system has an advantage in that it can be implemented without provision of a special circuit, but has a drawback in that a target correctness rate (i.e., the probability of being able to sending a response from a target desired by the reader back to the reader; hereinafter may simply be referred to as a "correctness rate") is reduced compared to the multi-response system.

On the other hand, in the multi-response system, the front end sends back multiple poling responses in response to polling from the reader. Thus, the reader, when it supports multi-response reception, performs processing on a target corresponding to a desired polling response selected from the multiple polling responses. Thus, in the multi-response system, a special circuit for sending back the responses at once is provided in the front end to thereby complicate the implementation, but the correctness rate can be increased compared to the single-response system.

SUMMARY

As illustrated in FIG. 2, with the front end having the function of the multi-response system, for example, if only two time slots are available when it is desired to send back three polling responses, no polling responses can be sent back at once because of the insufficient number of slots. Thus, in the multi-response system, when the number of slots is large, all the polling responses can be sent back, but when the reader performs polling with a small TSN (time slot number), such as TSN=0 or 1, there are cases in which the number of slots is insufficient and not all polling responses can be sent back.

In addition, for an existing device that does not support the multi-response system, in order to employ the multi-response system, a special circuit is typically installed as the special circuit to be provided in the front end.

One NFC reader operation standard defines operation specifications stating that the reader performs a polling operation twice and an operation of a P2P (peer-to-peer) application is allowed when a response to one of the two polling operations is received from the P2P application. It is preferable to provide a technology that supports the operation specifications.

In view of the foregoing situation, it is desirable to provide a technology that supports the above-described reader operation specifications and that ensures that a target desired by the reader is selected to allow for quick establishment of a communication, without implementation of a special circuit in the front end.

According to an embodiment of the present technology, there is provided a communication device. The communication device includes: targets that are each configured to execute predetermined processing; and a front end that is configured to select, from the targets, a confirmed target with which an external device is to communicate and that is configured to perform near-field communication with the external device. The front end is configured to select, during transmission of a command for selecting at least one candidate of the confirmed target, a predetermined one of the targets once every two times as a transmission destination of the command.

The front end may be configured to broadcast, upon receiving a polling command from the external device, the polling command to the targets other than the predetermined target.

The predetermined target may be a P2P (peer-to-peer) application.

Of the targets, the targets other than the predetermined target may include at least one of a secure element and a UICC (universal integrated circuit card).

The front end may be configured to confirm the target with which the external device is to communicate, out of the at least one target selected as the at least one confirmed-target candidate, as the confirmed target.

The front end may be configured to confirm the confirmed-target candidate as the confirmed target when an identifier of the target selected as the confirmed-target candidate, the identifier being obtained from the target, and an identifier included in a command transmitted by the external device match each other.

The front end may be configured to confirm the confirmed-target candidate as the confirmed target when a command for confirming, as the confirmed target, the target selected as the confirmed-target candidate is received from the external device.

The front end may be configured to release, on a basis of a predetermined target release condition, the confirmed target from the target with which the external device is to communicate.

The front end may be configured to release, after the near-field communication with the external device is disconnected, the confirmed target upon receiving a polling command from the external device.

The front end may be configured to release the confirmed target when a command for terminating a communication between the external device and the confirmed target is received from the external device.

The communication device may be an independent device or may be an internal block included in one device.

According to an embodiment of the present technology, there is provided a control method or program corresponding to the above-described communication device according to the embodiment of the present technology.

In the communication device, the control method, and the program according to the embodiment of the present technology, a confirmed target with which an external device is to communicate is selected from targets that each execute predetermined processing and near-field communication is performed with the external device. During transmission of a command for selecting at least one candidate of the confirmed target, a predetermined one of the targets is selected once every two times as a transmission destination of the command.

According to the embodiment of the present technology, a communication can be quickly established.

BRIEF DESCRIPTION OF THE DRAWINGS

FIG. 2 illustrates an example of polling parameters and response conditions in a multi-response system;

DETAILED DESCRIPTION OF EMBODIMENTS

An embodiment of the present technology will be described below with reference to the accompanying drawings.

[Exemplary Configuration of NFC Device]

Figure 1:
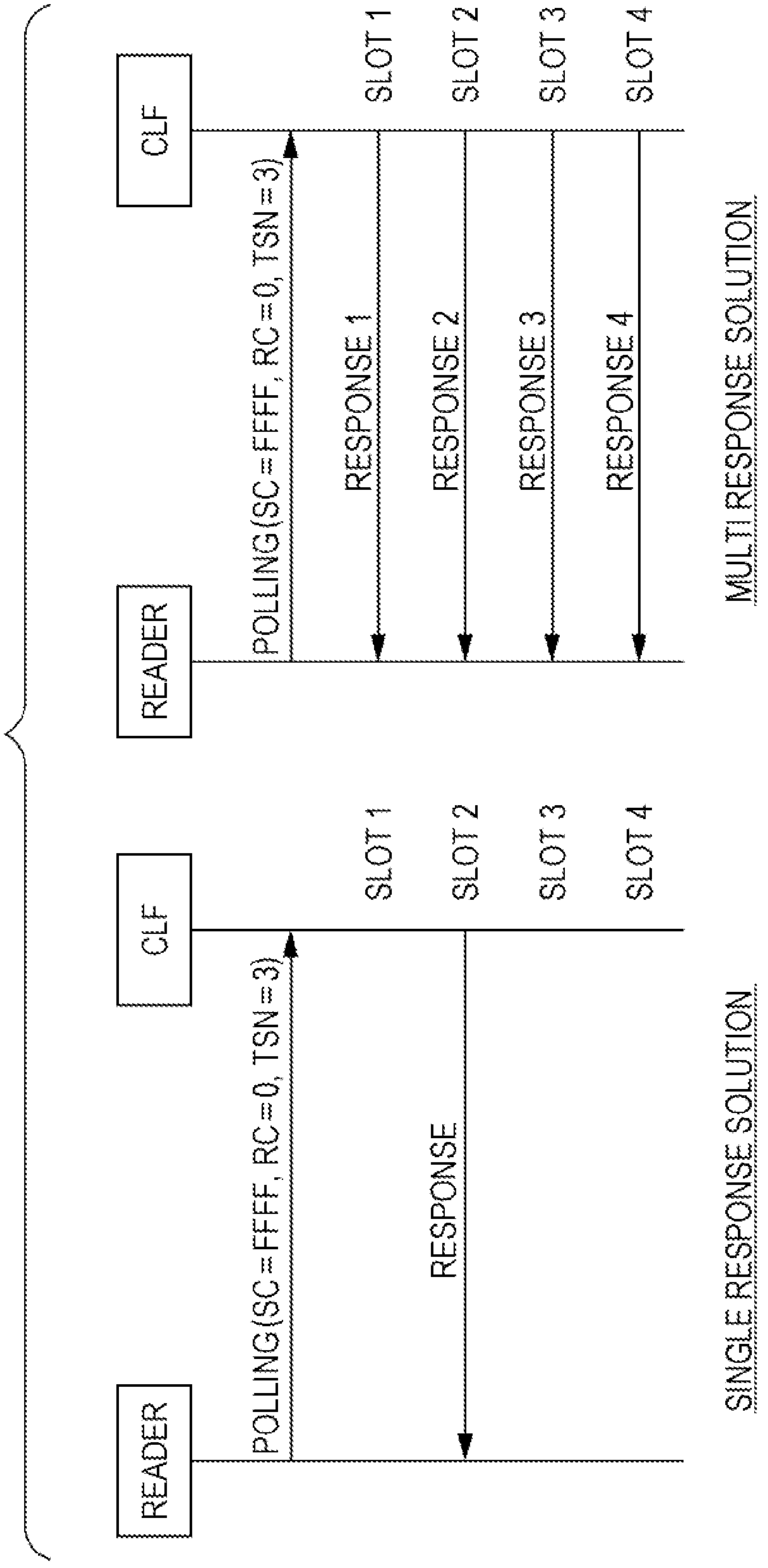
FIG. 1 illustrates a near-field communication system.
Figure 3:
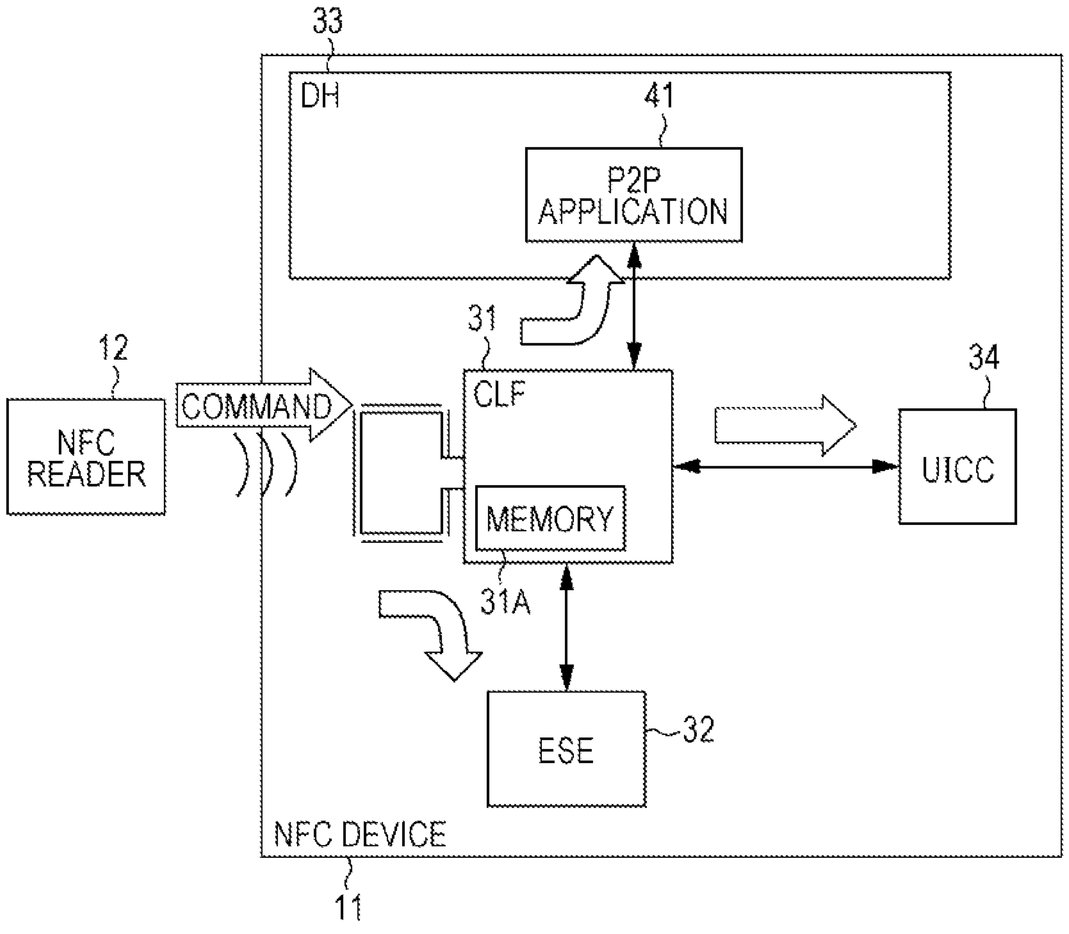
FIG. 3 illustrates an exemplary configuration of an NFC device.

FIG. 3 illustrates an exemplary configuration of an NFC device.

An NFC device 11 is configured as, for example, a mobile phone, an IC (integrated circuit) card, a mobile information terminal, or a personal computer. For example, using a carrier with a frequency of 13.56 MHz in an ISM (Industry Science Medical) band, the NFC device 11 performs a near-field communication with an external device, such as an NFC reader 12, over a distance of several tens of centimeters or less (including a case in which they are in contact with each other).

The NFC device 11 includes a CLF 31, an ESE 32, a DH 33, and a UICC 34. The CLF 31 is coupled with the ESE 32, the DH 33, and the UICC 34, which serve as targets, through corresponding lines to allow communication with each other.

The CLF (contactless front end) 31 is coupled to an antenna, provided in the NEC device 11, to perform a near-field communication with the NFC reader 12. In response to a command transmitted from the NFC reader 12, the CLF 31 selects one of the targets which is desired by the NFC reader 12 and performs control so as to allow communication with the NFC reader 12.

The CLF 31 has therein a memory 31A in which various types of data are stored as appropriate.

The ESE (embedded secure element) 32 is a secure element that achieves a security function in NFC applications for electronic payment, electronic tickets, entry control, and so on.

The DH (device host) 33 controls the operations of the individual elements in the NFC device 11. The DH 33 executes a P2P (peer-to-peer) application 41. The DH 33 can execute one or multiple P2P applications 41.

The UICC (universal integrated circuit card) 34 is implemented by, for example, a SIM (subscriber identity module) card. The UICC 34 executes an NFC application to realize, for example, an electronic payment function.

Thus, the ESE 32, the UICC 34, and the P2P application 41 each perform predetermined processing and serve a target with which the NFC reader 12 is to communicate. In other words, the targets include devices, such as the ESE 32 and the UICC 34, and applications, such as the P2P application 41.

The NEC device 11 is configured as described above.

[Detailed Exemplary Configuration of CLF]

Figure 4:
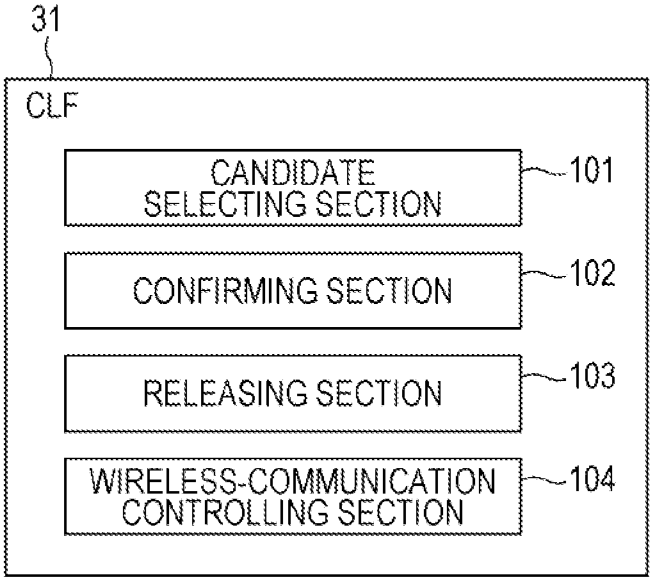
FIG. 4 illustrates an exemplary detailed configuration of a CLF.

FIG. 4 illustrates a detailed exemplary configuration of the CLF 31 illustrated in FIG. 3.

The CLF 31 includes a candidate selecting section 101, a confirming section 102, a releasing section 103, and a wireless-communication controlling section 104.

In accordance with a predetermined rule, the candidate selection section 101 performs candidate selection processing for selecting a candidate of a target with which the NFC reader 12 is to communicate (the candidate may hereinafter be referred to as a "target candidate"). As a result of the candidate selection processing, one or multiple targets are selected as one or more target candidates.

In accordance with a predetermined rule, the confirming section 102 performs confirmation processing for confirming the target selected as a target candidate by the candidate selection processing. As a result of the confirmation processing, the target with which the NFC reader 12 is to communicate is confirmed (this target is hereinafter referred to as a "confirmed target") out of the target(s) selected as the target candidate(s).

In accordance with a predetermined rule, the releasing section 103 performs release processing for releasing the target confirmed by the confirmation processing. As a result of the release processing, the confirmed target is released from the communication target of the NFC reader 12.

The wireless-communication controlling section 104 performs processing for controlling a near-field communication with the NFC reader 12.

The CLF 31 is configured as described above.

[Routing Processing]

Figure 5:
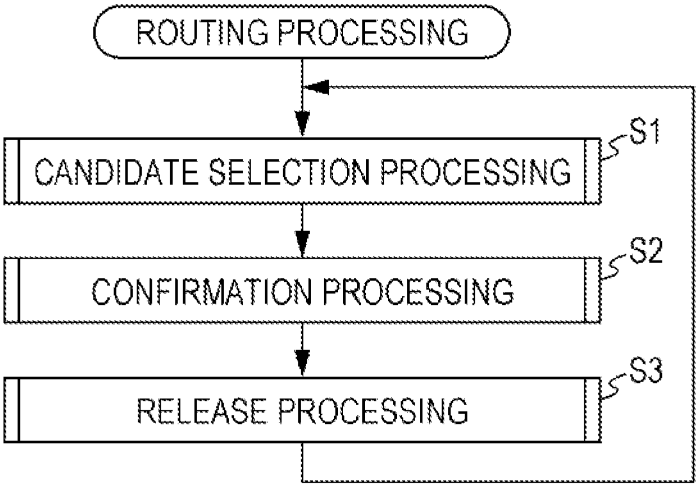
FIG. 5 is a flowchart illustrating routing processing.

Next, routing processing executed by the CLF 31 will be described with reference to a flowchart illustrated in FIG. 5.

In step S1, the candidate selecting section 101 performs candidate selection processing. In the candidate selection processing, one or more targets are selected from multiple targets as one or more target candidates.

Details of the candidate selection processing are described below with reference to FIGS. 6 to 11.

In step S2, the confirming section 102 performs confirmation processing. In the confirmation processing, a confirmed target that serves as the communication target of the NFC reader 12 is confirmed out of the one or more targets selected as the target candidate(s).

Details of the confirmation processing are described below with reference to FIGS. 12 to 15.

In step S3, the releasing section 103 performs release processing. In the release processing, the confirmed target is released from the communication target of the NFC reader 12. That is, the confirmed target once confirmed as the communication target of the NFC reader 12 remains as the communication target until the release processing is performed to release the confirmed target from the communication target.

Figure 16:
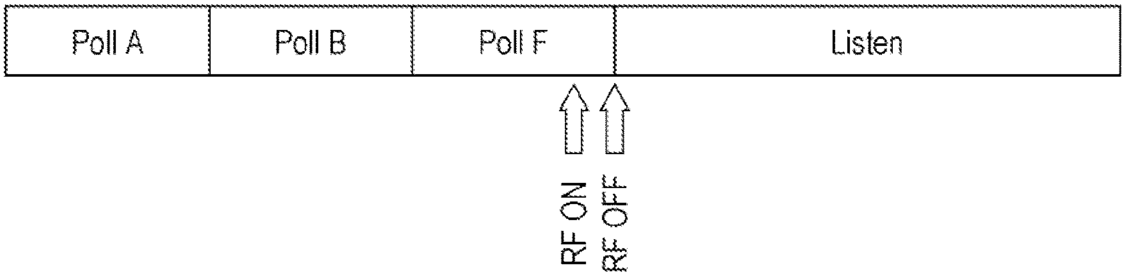
FIG. 16 is a diagram illustrating release of a target when an RF signal is lost.

Details of the release processing are described below with reference to FIGS. 16 to 18. Also, some standards do not define the release processing, and when such a standard is employed, the processing in step S3 may be omitted.

The description of the routing processing has been described thus far.

According to the above-described routing processing, one or more target candidates are selected from multiple targets and the confirmed target that serves as the communication target of the NFC reader 12 is confirmed out of the selected one or more candidates. A communication is performed between the confirmed target, confirmed as the communication target, and the NFC reader 12 until the confirmed target is released.

[Candidate Selection Processing]

Next, candidate selection processing corresponding to step S1 illustrated in FIG. 5 will be described with reference to FIGS. 6 to 11.

Now, four systems, i.e., a fixed target system, a simple rotation system, a simple rotation system including a skip function, and a P2P-main rotation system including a skip function, will be described with respect to the candidate selection processing.

The fixed target system is a system in which a default target is selected unless another target is particularly selected by an application.

When the fixed target system is employed, there is an advantage in that the implementation is quite simple, but there is a disadvantage in that the correctness rate of the target-candidate selection is reduced. For example, when the target is fixed to the ESE 32, applications, such as the P2P application 41 and the UICC 34, are not operable unless a user performs pre-setting.

The simple rotation system is a system in which the target candidate is sequentially changed to select the target. That is, each time the CLF 31 is polled by the NFC reader 12, the CLF 31 selects a different target candidate and transmits a response received from the selected target.

Figure 6:
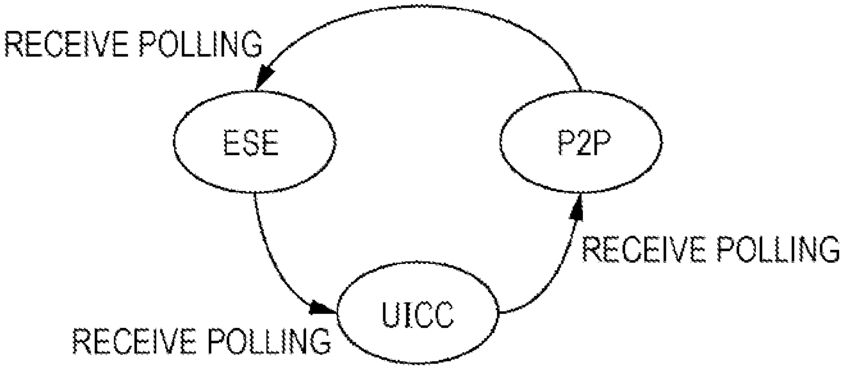
FIG. 6 is a diagram illustrating candidate transition in a simple rotation system.

More specifically, as illustrated in FIG. 6, the ESE 32 is selected as a target candidate in response to a first polling operation and then rotation is performed each time a polling operation is performed, so that the UICC 34, the P2P application 41, and the ESE 32 are sequentially selected as target candidates.

When the simple rotation system is employed, there is an advantage in that the implementation is simple, but there is a disadvantage in that the correctness rate of the target-candidate selection does not increase, since there are cases in which a retry of polling is repeated in order to select a desired target.

The rotation system including the skip function is a system in which a function for skipping a target determined to be excluded and selecting a next target as a target candidate is further added to the above-described simple rotation system. That is, each time the CLF 31 is polled by the NFC reader 12, the CLF 31 checks polling parameters of the polling to thereby determine a target to be excluded. Then, when one target is determined to be a target candidate to be excluded, the CLF 31 skips the target to be excluded and selects a next target as a target candidate.

Figure 7:
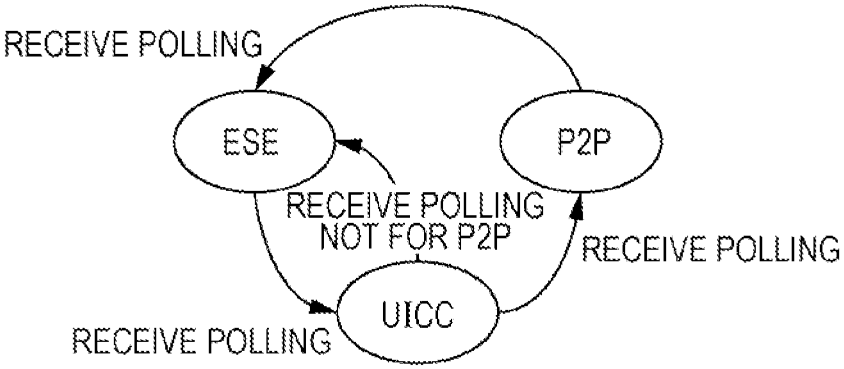
FIG. 7 is a diagram illustrating candidate transition in a simple rotation system including a skip function.

More specifically, for example, when a polling parameter SC (system code) is not "FFFF" or when a polling parameter RC (request code) is "1", the polling is not for the P2P application 41 and thus the CLF 31 switches the target candidate from the UICC 34 to the ESE 32, as illustrated in FIG. 7. That is, while the next target candidate after the UICC 34 is supposed to be the P2P application 41 in the above-described simple rotation, the P2P application 41 is skipped and the target candidate is forcibly switched to the ESE 32.

When the simple rotation system including the skip function is employed, not only can the implementation be realized with a simple scheme equivalent to that of the above-described simple rotation system, but the correctness rate of the target-candidate selection can also be improved by identifying a target to be excluded according to a predetermined rule and deselecting the identified target.

The P2P-main rotation system including the skip function is a system in which the above-described simple rotation including the skip function is performed with the P2P application 41 being the rotation center.

Figure 8:
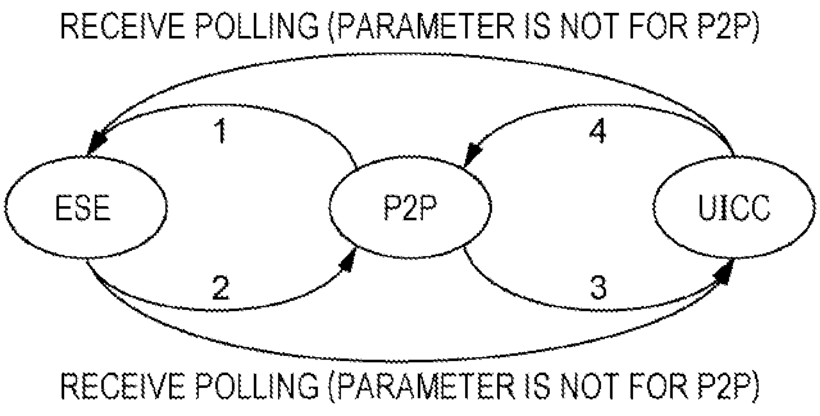
FIG. 8 is a diagram illustrating candidate transition in a P2P-main rotation system including a skip function.

More specifically, as illustrated in FIG. 8, the rotation is performed, for example, in the order of the P2P application 41, the ESE 32, the P2P application 41, the UICC 34, and the P2P application 41, with the P2P application 41 being the rotation center. One NFC reader operation standard defines operation specifications stating that the NFC reader 12 performs a polling operation twice and a P2P operation is allowed when a response to one of the two polling operations is received from the P2P application 41. In order to support the operation specifications, the rotation in this example is adapted so that a response from the P2P application 41 is sent back once every two times.

With this arrangement, since the P2P application 41 among the P2P application 41, the ESE 32, and the UICC 34 is selected once every two times, it is ensured that the NFC reader 12 performs an operation on the P2P application 41. For example, when the polling is not for the P2P application 41, the P2P application 41 is skipped in the rotation and the target candidate is forcibly switched to the ESE 32 or the UICC 34, as in the above-described rotation system including the skip function.

Although a case in which the P2P application 41 is selected as a target candidate once every two times has been described in the example of FIG. 8, any target other than the P2P application 41 may also be selected as a target candidate once every two times in accordance with an operational rule for the NFC reader 12. That is, one of three or more targets may be selected as a target candidate once every two times, so as to ensure that the NFC reader 12 can select a desired target to quickly establish a communication.

When the P2P-main rotation system including the skip function is employed, not only can the implementation be realized with a simple scheme equivalent to that of the above-described simple rotation system, but the correctness rate of the target-candidate selection can also be improved. Since a predetermine target is selected with higher priority in accordance with an operational rule for the NFC reader 12, it is also possible to achieve a match with the operation of the NFC reader 12.

The CLF 31 can also send a polling command, received from the NFC reader 12, to one target by unicasting or to multiple targets by broadcasting.

In the unicast, a polling command is sent to only one target currently selected as a target candidate. Thus, the unicast transmission achieves a simple implementation, but does not contribute to an improvement in the correctness rate of the target-candidate selection.

In the broadcast, on the other hand, a polling command is sent to multiple targets, regardless of whether the targets are selected as target candidates.

Figure 9:
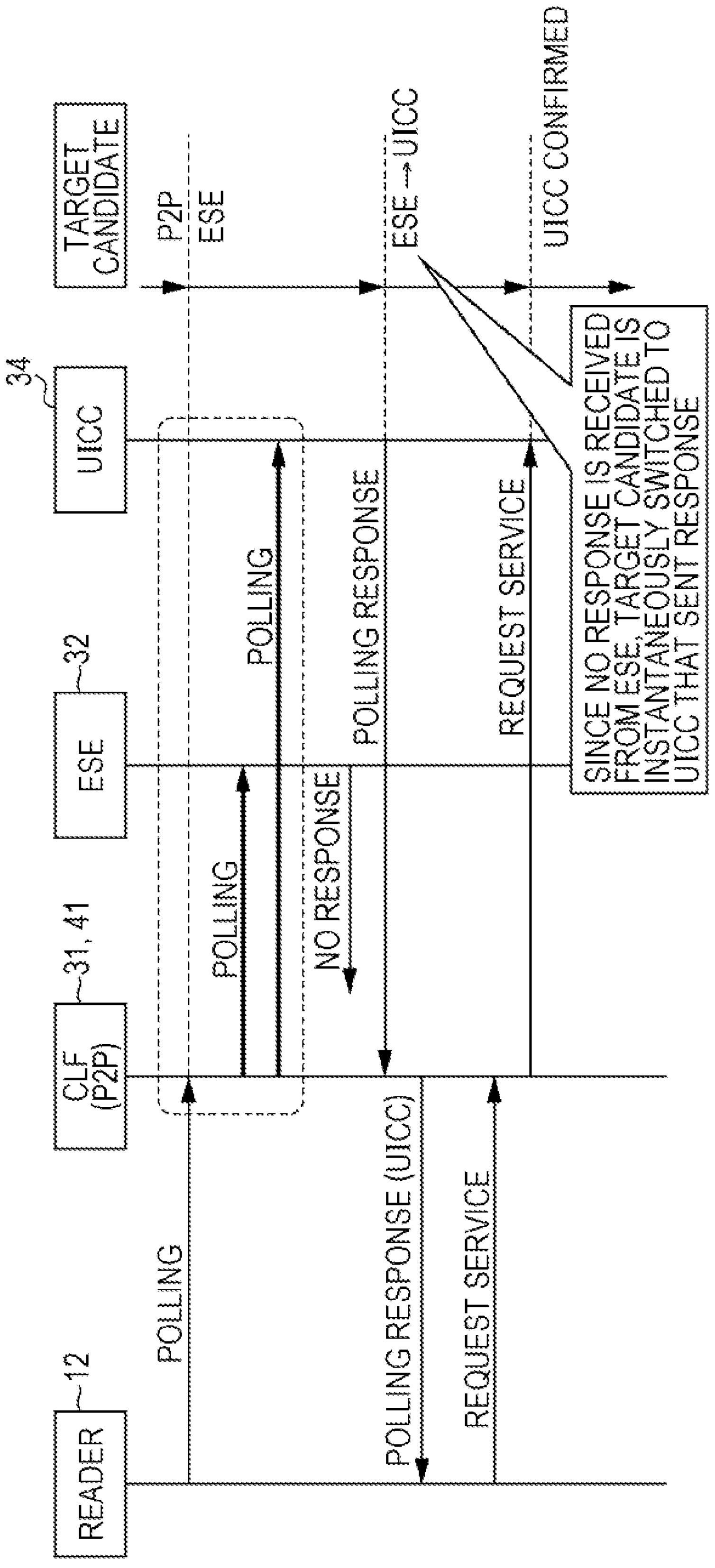
FIG. 9 is a sequence diagram illustrating broadcast transmission.

More specifically, for example, when the ESE 32 is a target candidate and the NFC reader 12 transmits a polling command designating the SC for the UICC 34, the CLF 31 broadcasts a polling command to both of the ESE 32 and the UICC 34, as illustrated in FIG. 9. As a result, since no response is received from the ESE 32 and a response is received from the UICC 34, the CLF 31 can switch the target candidate from the ESE 32 to the UICC 34 to send a response back to the NFC reader 12. That is, when the broadcast transmission is performed, the implementation is complicated compared to the unicast transmission but a significant improvement in the correctness rate of target-candidate selection can be expected.

Figure 10:
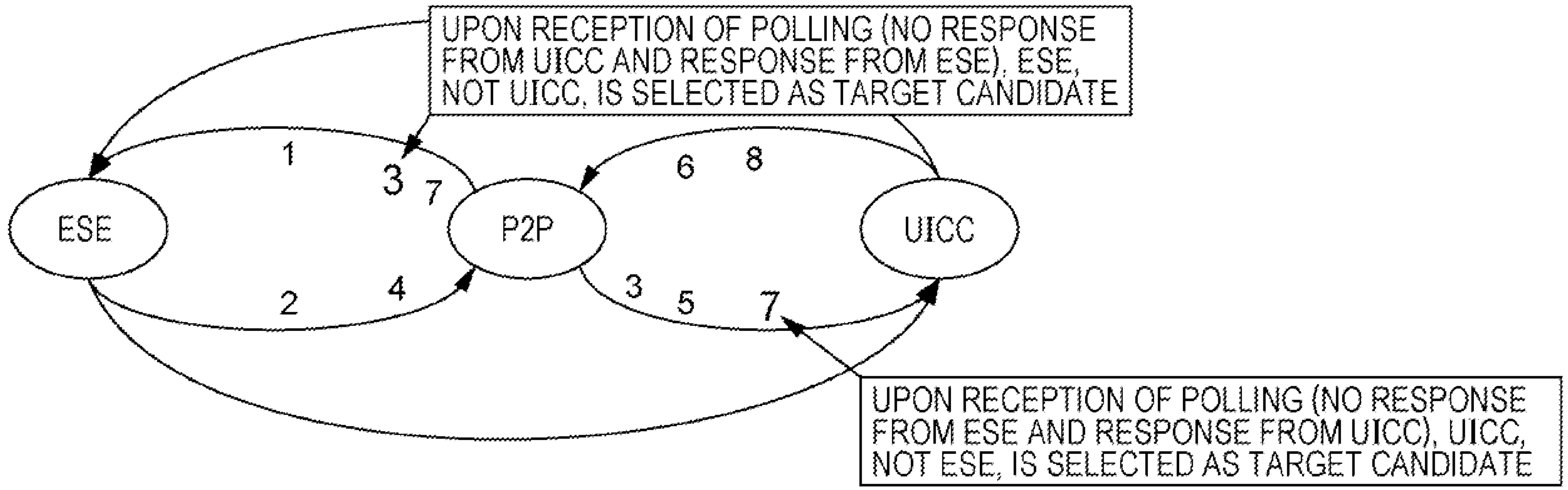
FIG. 10 is a diagram illustrating candidate transition when the broadcast transmission is incorporated into the P2P-main rotation system including the skip function.

FIG. 10 is a diagram illustrating target candidate transition when the broadcast transmission described above and illustrated in FIG. 9 is incorporated into the P2P-main rotation system including the skip function described above and illustrated in FIG. 8.

As described above, in the P2P-main rotation system including the skip function, the rotation is performed, for example, in the order of the P2P application 41, the ESE 32, the P2P application 41, the UICC 34, and the P2P application 41, with the P2P 41 application being the rotation center. In contrast, when the broadcast transmission is incorporated, the target candidate changes from the P2P application 41 to the ESE 32 or the UICC 34 in response to a response to the broadcast transmission.

For example, after the target candidate changes in the order of the P2P application 41, the ESE 32, and the P2P application 41, the polling command is broadcast and, when no response is received from the UICC 34 and a response is received from the ESE 32, the ESE 32, not the UICC 34, is selected as a target candidate. After the target candidate changes in the order of the P2P application 41, the UICC 34, and the P2P application 41, a polling command is broadcast and, when a response is received from the UICC 34 and no response is received from the ESE 32, the UICC 34, not the ESE 32, is selected as a target candidate and the target candidate is changed to the P2P application 41.

That is, when the broadcast transmission is incorporated into the P2P-main rotation system including the skip function, the rotation is performed, for example, in the order of the P2P application 41, the ESE 32, the P2P application 41, the ESE 32, the P2P application 41, the UICC 34, the P2P application 41, the UICC 34, and the P2P application 41, with the P2P application 41 being the rotation center.

Not only is the target-candidate selection performed so that one of three or more targets is selected once every two times, but also the broadcast transmission is performed as described above, thus making is possible to further improve the correctness rate of the target other than the target selected once every two times. This can ensure that the NFC reader 12 selects a desired target to establish a communication.

Next, a flow of candidate selection processing corresponding to step S1 in FIG. 5, the candidate selection processing being executed by the candidate selecting section 101, will be described with reference to a flowchart illustrated in FIG. 11.

Figure 11:
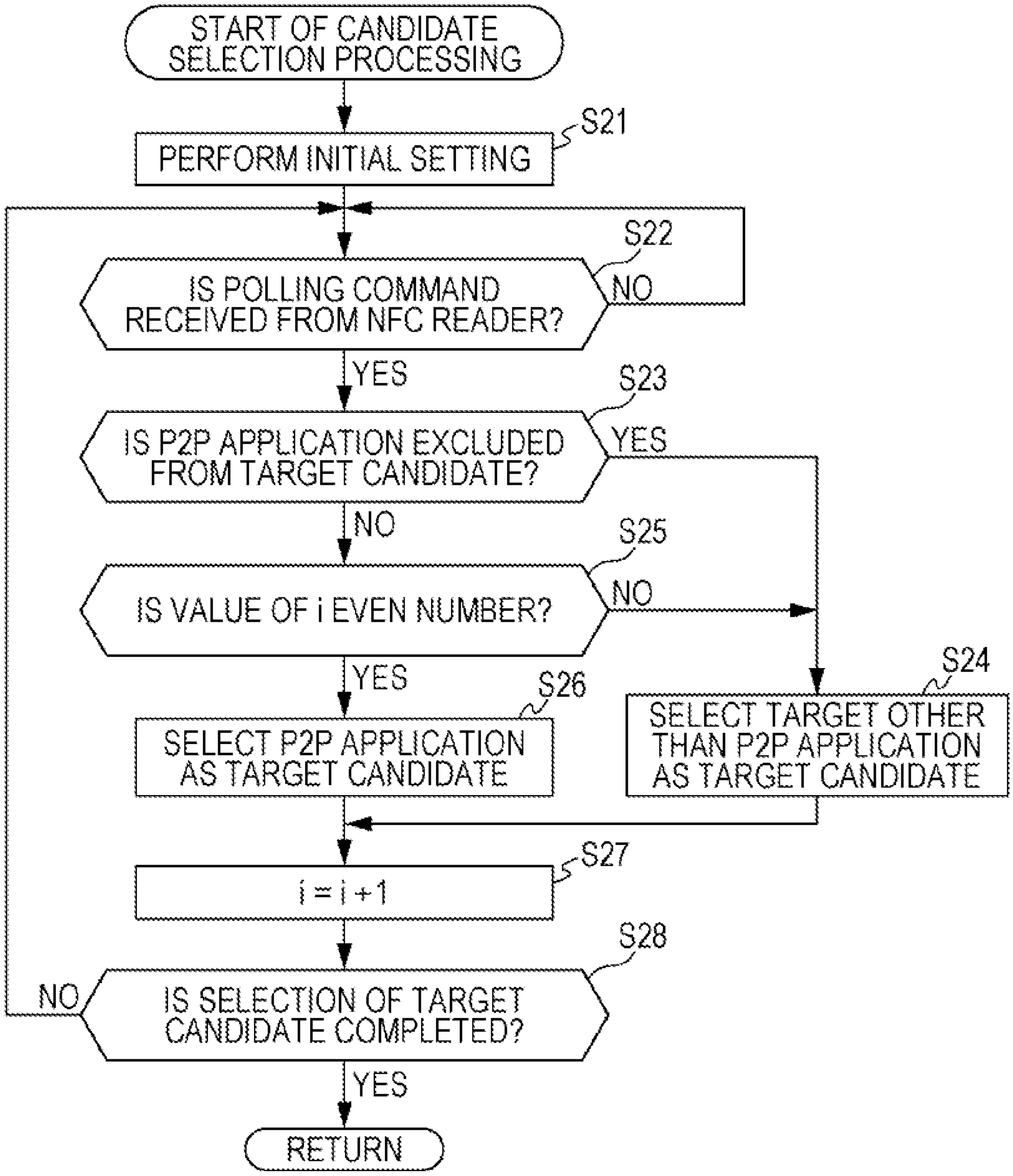
FIG. 11 is a flowchart illustrating a flow of candidate selection processing.

FIG. 11 illustrates candidate selection processing using the P2P-main rotation system including the skip function, this candidate selection processing being the most efficient candidate selection processing.

In step S21, the candidate selecting section 101 performs initial setting. In the initial setting, for example, a variable i is set to 0 or 1, depending on whether or not the rotation is to be started at the P2P application 41.

In step S22, the candidate selecting section 101 controls the wireless-communication controlling section 104 to determine whether or not a polling command is received from the NFC reader 12. When it is determined in step S22 that a polling command is received, the process proceeds to step S23.

In step S23, on the basis of polling parameters included in the polling command received from the NFC reader 12, the candidate selecting section 101 determines whether or not the P2P application 41 is excluded from the target candidate. In this case, for example, when the polling parameter SC is “FFFF” or the polling parameter RC is “1”, the polling is not for the P2P application 41, as described above.

Although an example in which the P2P application 41 is excluded from the target candidate has been described above, any target other than the P2P application 41 may be excluded in accordance with the polling parameters.

When it is determined in step S23 that the P2P application 41 is excluded from the target candidate, the process proceeds to step S24. In step S24, the candidate selecting section 101 selects the target other than the P2P application 41 as a target candidate. In this case, for example, the ESE 32 or the UICC 34 is selected as a target candidate.

On the other hand, when it is determined in step S23 that the P2P application 41 is a target of a target candidate, the process proceeds to step S25. In step S25, the candidate selecting section 101 determines whether or not the value of the variable i is an even number.

When it is determined in step S25 that the value of the variable i is an even number, the process proceeds to step S26. In step S26, the candidate selecting section 101 selects the P2P application 41 as a target candidate.

On the other hand, when it is determined in step S25 that the value of the variable i is an odd number, the process proceeds to step S24. In step S24, the candidate selecting section 101 selects the target other than the P2P application 41 as a target candidate. In this case, for example, the ESE 32 or the UICC 34 is selected as a target candidate. In this case, as described above with reference to FIG. 9, it is possible to improve the correctness rate of target-candidate selection by broadcasting a polling command to the ESE 32 and the UICC 34.

Upon completion of step S24 or S26, the process proceeds to step S27. In step S27, the candidate selecting section 101 increments the value of the variable i by 1. As a result, in next determination processing in step S25, the even number and the odd number are reversed and thus an opposite result is obtained in the determination. That is, when the P2P application 41 is selected as a target candidate most recently, the target other than the P2P application 41 is selected in the next selection. Conversely, when the target other than the P2P application 41 is selected most recently, the P2P application 41 is selected as a target candidate in the next selection.

After completion of the processing in step S27, the process proceeds to step S28 in which the candidate selecting section 101 determines whether or not the selection of the target candidate is completed.

When it is determined in step S28 that the selection of the target candidate is not completed, the process returns to step S22 and the above-described processing is repeated. That is, the processing in step S22 to S28 is repeated until it is determined that the selection of the target candidate is completed (Yes in step S28), so that the P2P application 41 is selected as a target candidate once every two times. However, for example, when the polling is not for the P2P application 41, the ESE 32 or the UICC 34 is forcibly selected as a target candidate, as described above.

When it is determined in step S28 that the selection of the target candidate is completed, the candidate selection processing illustrated in FIG. 11 ends.

As described above, when the P2P-main rotation system including the skip function is employed to perform the candidate selection processing, not only can the implementation be realized with a simple scheme comparable to that of the above-described simple rotation system, but the correctness rate of the target-candidate selection can also be improved.

Since a predetermine target, such as the P2P application 41, is selected with higher priority in accordance with an operational rule for the NFC reader 12, it is possible to achieve a match with the operation of the NFC reader 12. In addition, since a polling command is broadcast to multiple targets other than a predetermined target, the correctness rate of the target-candidate selection can be significantly improved.

[Confirmation Processing]

Next, confirmation processing corresponding to step S2 illustrated in FIG. 5 will be described with reference to FIGS. 12 to 15.

Two systems, i.e., an IDm comparison system and an ATR_REQ reception system, will now be described as exemplary systems for the confirmation processing.

The IDm comparison system is a system in which, when the NFC reader 12 performs a polling operation on the CLF 31 multiple times in the single-response system, the CLF 31 sends back a different polling response in response to each polling operation by using an IDm (a manufacture ID, which is unique ID of an IC chip), to thereby make a response in a pseudo manner.

Figure 12:
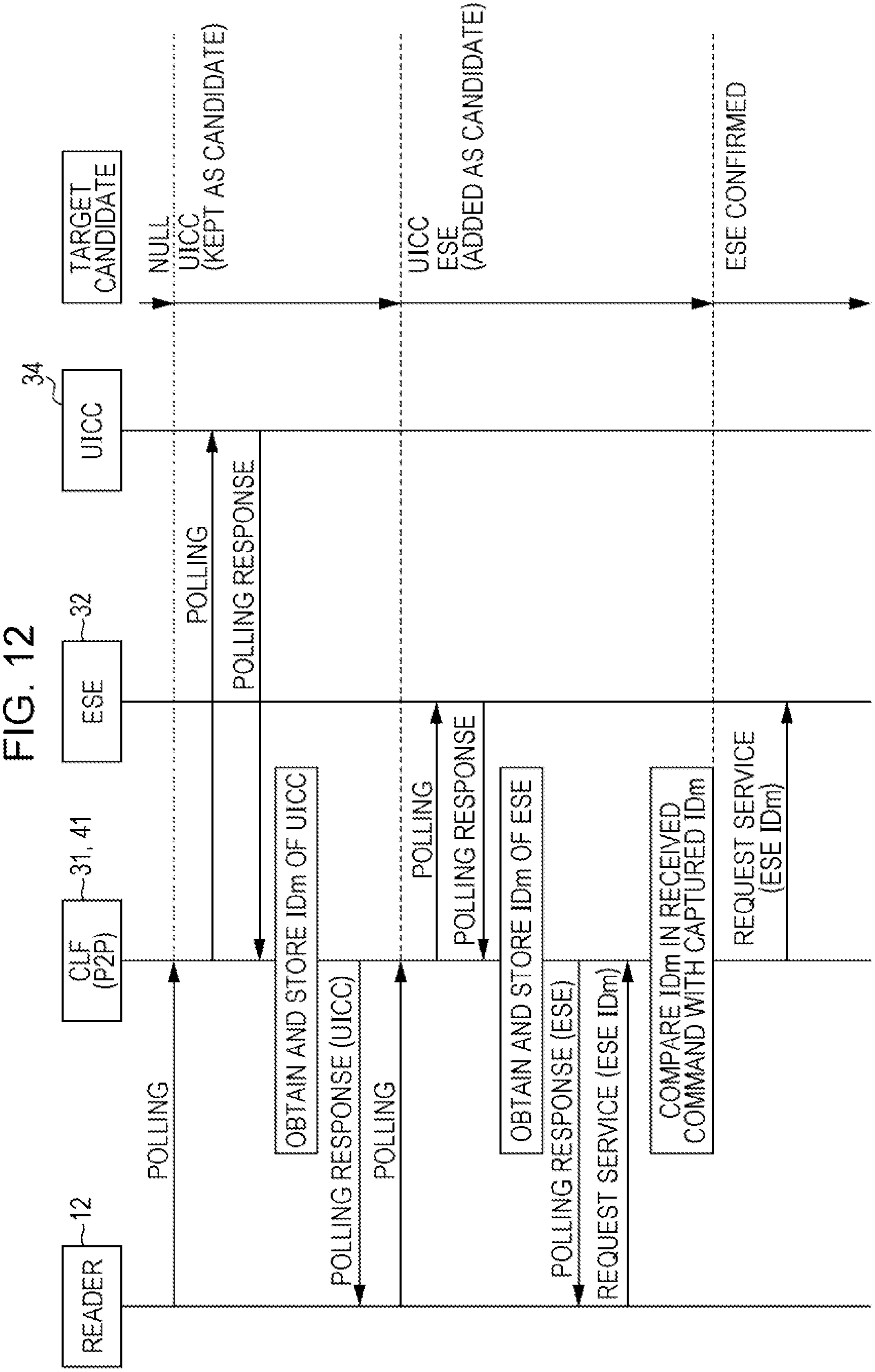
FIG. 12 is a sequence diagram illustrating IDm comparison system.

More specifically, as illustrated in FIG. 12, the CLF 31 performs the candidate selection processing in response to a polling command from the NFC reader 12. When receiving a response from the UICC 34, the CLF 31 obtains the IDm of the UICC 34 and stores the IDm in the memory 31A. As a result, the UICC 34 is kept as a target candidate. The CLF 31 then transmits a polling response including the IDm of the UICC 34 back to the NFC reader 12.

Subsequently, when a different polling command is transmitted from the NFC reader 12, the CLF 31 performs the candidate selection processing. When receiving a response from the ESE 32, the CLF 31 obtains the IDm of the ESE 32 and stores the IDm in the memory 31A. As a result, the ESE 32 is added as a candidate, so that the UICC 34 and the ESE 32 are selected as target candidates. The CLF 31 then transmits a polling response including the IDm of the ESE 32 back to the NFC reader 12.

Thereafter, when a non-polling command, such as a request service, is transmitted from the NFC reader 12, the CLF 31 compares the IDm included in the received command with each IDm stored in the memory 31A and confirms, as a confirmed target that serves as the communication target, the target candidate having a matched IDm. For example, when the IDm of the ESE 32 is included in the request service from the NFC reader 12, the CLF 31 confirms the ESE 32 as a confirmed target and transmits the request service to the ESE 32.

When the IDm comparison processing is employed, the processing for obtaining and comparing the IDm and so on are added, but the correctness rate of the target can be improved with respect to the NFC reader 12 that transmits a polling command to the CLF 31 multiple times. However, before the target candidate is confirmed, any command that does not include an IDm is not receivable.

Next, a flow of the confirmation processing using the IDm comparison system, the confirmation processing being executed by the confirming section 102, will be described with reference to a flowchart illustrated in FIG. 13.

In step S41, the confirming section 102 determines whether or not a target candidate is selected in the candidate selection processing. When it is determined in step S41 that a target candidate is selected, the process proceeds to step S42.

In step S42, the confirming section 102 obtains the IDm of the selected target candidate. In step S43, the confirming section 102 stores the IDm in the memory 31A.

Upon completion of the processing in step S43, the process proceeds to step S44 in which the confirming section 102 controls the wireless-communication controlling section 104 to determine whether or not a non-polling command is received from the NFC reader 12.

When it is determined in step S44 that a non-polling command is not received, the process returns to step S41 and the above-described processing is repeated. That is, the processing in steps S41 to S44 is repeated, and when a target candidate is selected, the IDm of the selected target is stored in the memory 31A.

On the other hand, when it is determined in step S44 that a non-polling command is received, the process proceeds to step S45. In step S45, the confirming section 102 compares the IDm included in the non-polling-command from the NFC reader 12 with each IDm stored in the memory 31A. In step S46, the confirming section 102 determines whether or not the IDm included in the command matches any IDm stored in the memory 31A.

When it is determined in step S46 that the IDm included in the command matches any IDm stored in the memory 31A, the process proceeds to step S47. In step S47, the confirming section 102 confirms, as a confirmed target, a target candidate whose IDm matches any IDm stored in the memory 31A. For example, when the IDm of the ESE 32 is stored in the memory 31A and is also included in the request service from the NFC reader 12, the ESE 32 is determined as a confirmed target.

On the other hand, when it is determined in step S46 that the IDm does not match, step S47 is skipped. In this case, since no communication target is confirmed, the candidate selection processing is continued. Even when the communication with the NFC reader 12 continues, the CLF 31 does not make a response and stays in the same state, since no route has been established. Thereafter, when the communication between the NFC reader 12 and the CLF 31 is disconnected, the target candidate is reset and thus the processing is restarted from the polling by the NEC reader 12. That is, after the communication with the NFC reader 12 is disconnected, the NFC reader 12 performs polling again.

Figure 13:
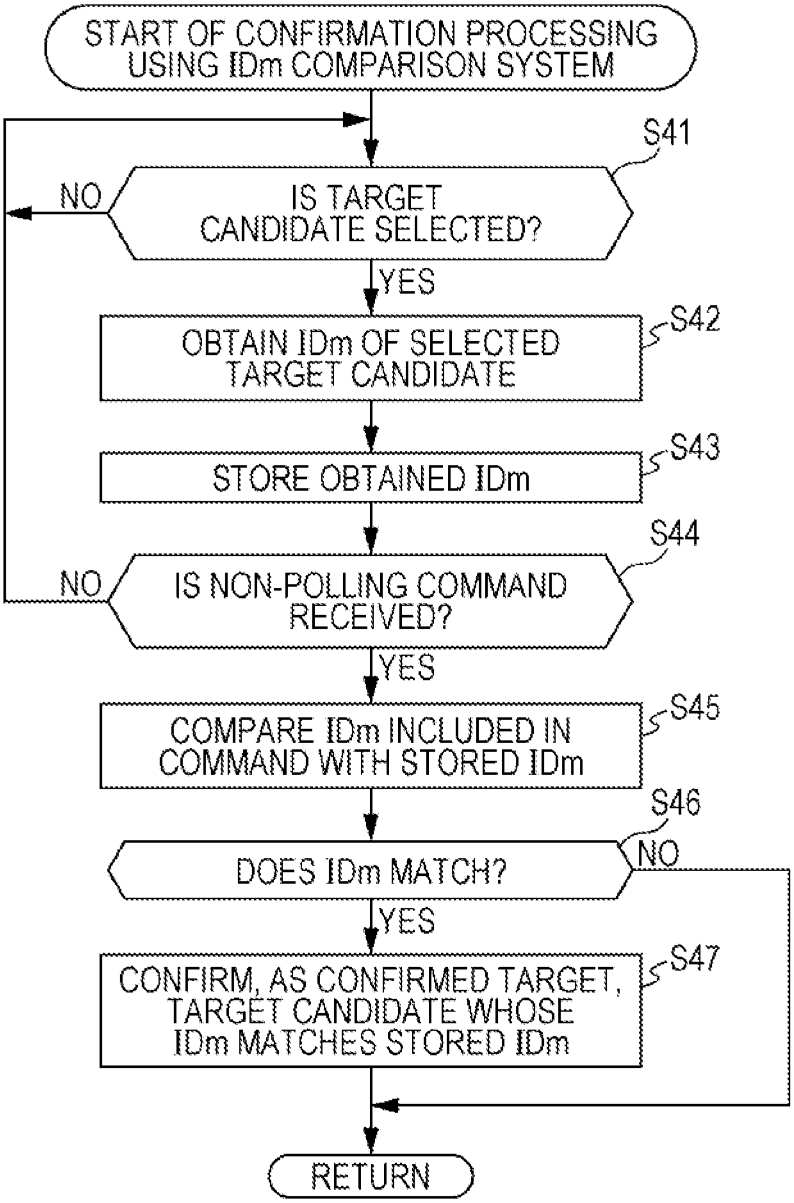
FIG. 13 is a flowchart illustrating a flow of confirmation processing using an IDm comparison system.

When a confirmed target is confirmed (in step S47) or when it is determined that the IDm does not match (No in step S46), the confirmation processing in FIG. 13 ends.

When the confirmation processing is performed using the IDm comparison system, the correctness rate of the target can be improved with respect to the NFC reader 12 that transmits a polling command to the CLF 31 multiple times.

The ATR_REQ reception system is a system in which, when a correct ATR_REQ (attribute request) is received in the multi-response system or the single-response system after a response indicating the P2P application 41 is sent back to the NFC reader 12, an ATR_RES is sent back and a confirmed target is determined.

Figure 14:
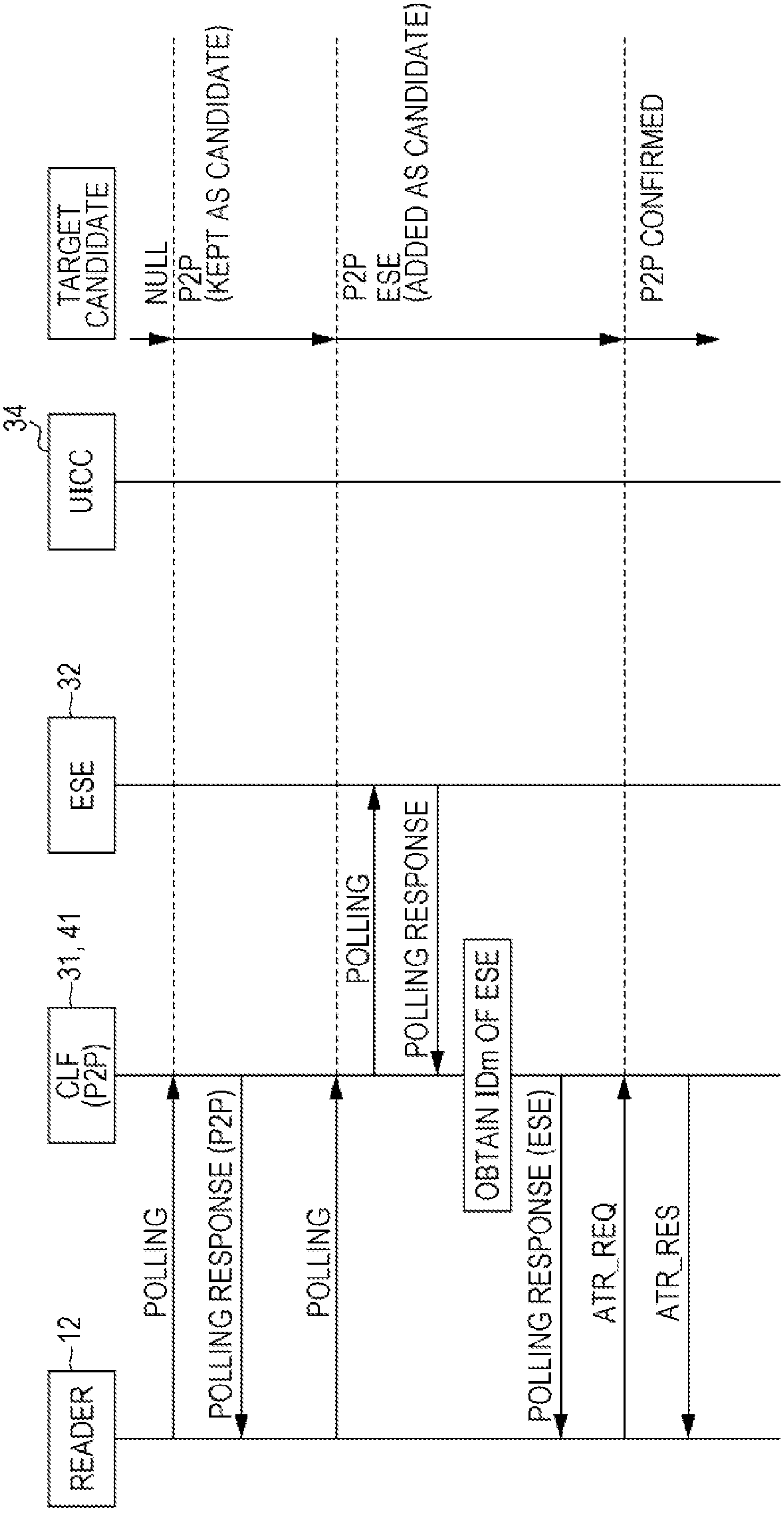
FIG. 14 is a sequence diagram illustrating an ATR_REQ reception system.

More specifically, as illustrated in FIG. 14, in response to a polling command from the NFC reader 12, the CLF 31 performs the candidate selection processing and sends back a polling response of the P2P application 41. As a result, the P2P application 41 is kept as a target candidate.

Subsequently, when a different polling command is transmitted from the NFC reader 12, the CLF 31 performs the candidate selection processing. When receiving a response from the ESE 32, the CLF 31 obtains the IDm of the ESE 32 and stores the IDm in the memory 31A. As a result, the ESE 32 is added as a candidate, so that the P2P application 41 and the ESE 32 are selected as target candidates. The CLF 31 then transmits a polling response including the IDm of the ESE 32 back to the NFC reader 12.

Thereafter, when an ATR_REQ is transmitted from the NFC reader 12, the CLF 31 confirms the P2P application 41 as a confirmed target and sends an ATR_RES back to the NFC reader 12.

In response to the ATR_REQ from the NFC reader 12, the CLF 31 confirms the P2P application 41 as a confirmed target. In this case, the IDm comparison for the target confirmation is not performed and a target is confirmed upon reception of a correct ATR_REQ.

Next, a flow of the confirmation processing using the ATR_REQ reception system, the confirmation processing being executed by the confirming section 102, will be described with reference to a flowchart illustrated in FIG. 15.

In steps S61 to S63, the confirming section 102 obtains the IDm of the selected target candidate and stores the IDm in the memory 31A, as in steps S41 to S43 illustrated in FIG. 13.

In step S64, the confirming section 102 controls the wireless-communication controlling section 104 to determine whether or not an ATR_REQ is received from the NFC reader 12.

When it is determined in step S64 that no ATR_REQ is received, the process returns to step S61 and the above-described processing is repeated. That is, the processing in steps S61 to S64 is repeated, and when a target candidate is selected, the IDm of the selected target is stored in the memory 31A.

On the other hand, when it is determined in step S64 that an ATR_REQ is received, the process proceeds to step S65. In step S65, the confirming section 102 confirms the P2P application 41 as a confirmed target.

Figure 15:
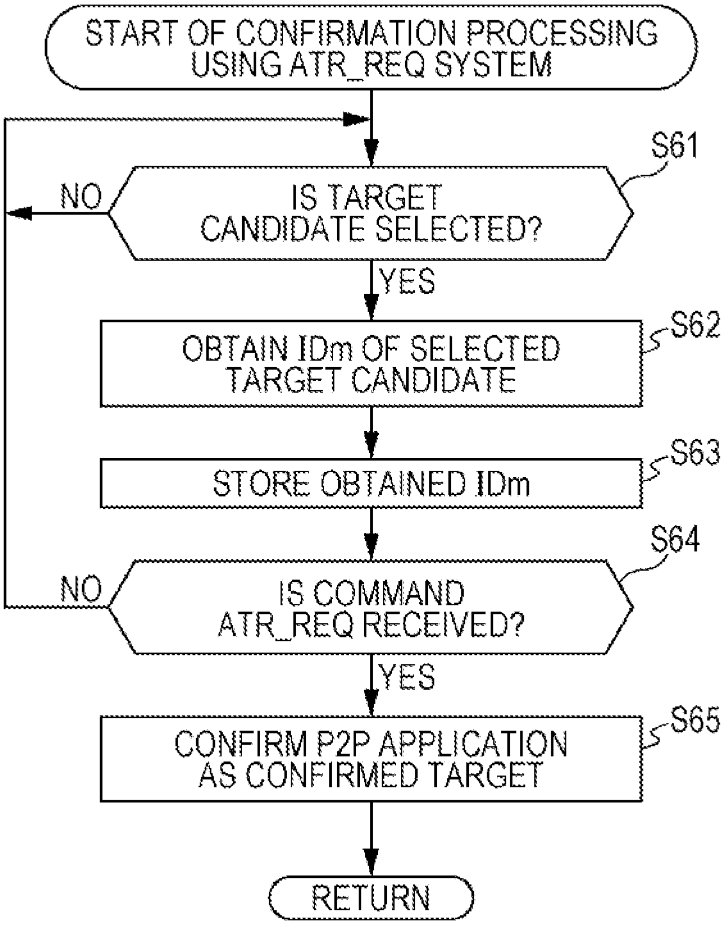
FIG. 15 is a flowchart illustrating a flow of confirmation processing using the ATR_REQ reception system.

When the P2P application 41 is confirmed as a communication target, the confirmation processing in FIG. 15 ends.

As described above, when the confirmation processing is performed using the ATR_REQ reception system, the correctness rate of the target can be improved with respect to the NEC reader 12 that transmits a polling command to the CLF 31 multiple times.

For example, when a FALP (FeliCa Ad-hoc Link Protocol) is implemented on the DH 33, the confirming section 102 monitors a propose ad-hoc command transmitted from a FALP-specific NFC reader 12 and can forcibly confirm a FALP target as a confirmed target upon receiving the propose ad-hoc command. That is, the confirming section 102 monitors a command transmitted from the NFC reader 12, and upon receiving the predetermined command, the confirming section 102 forcibly confirms, as a confirmed target, a predetermined target corresponding to the received command.

[Release Processing]

Next, release processing will be described with reference to FIGS. 16 to 18.

Five systems, i.e., a forced-termination system, an RF-loss release system, a polling-reception release system, an RLS_REQ-reception release system, and a DSL_REQ-reception release system, will now be described as exemplary systems for the release processing.

The forced-termination system is a system in which, when an application executed by the DH 33 is terminated by a user operation, the DH 33 forcibly releases the confirmed target.

The RF-loss release system is a system in which, when a near-field communication between the NFC reader 12 and the CLF 31 is disconnected and an RF (radio frequency) signal is lost, the confirmed target is released.

In the RF-loss release system, when on/off chattering of an RE signal occurs, unexpected loss of the RF signal may cause releasing of the communication target, resulting in user inconvenience. More specifically, when a carrier is detected at the end of polling during a near-field communication between the NEC reader 12 and the CLF 31, as illustrated in FIG. 16, an RF signal is turned on for a moment and then the communication partner enters a listen mode and the RF signal is turned off. The detection of the turn-off of the RF signal and the release of the confirmed target at this point is not preferable in terms of the processing.

Figure 17:
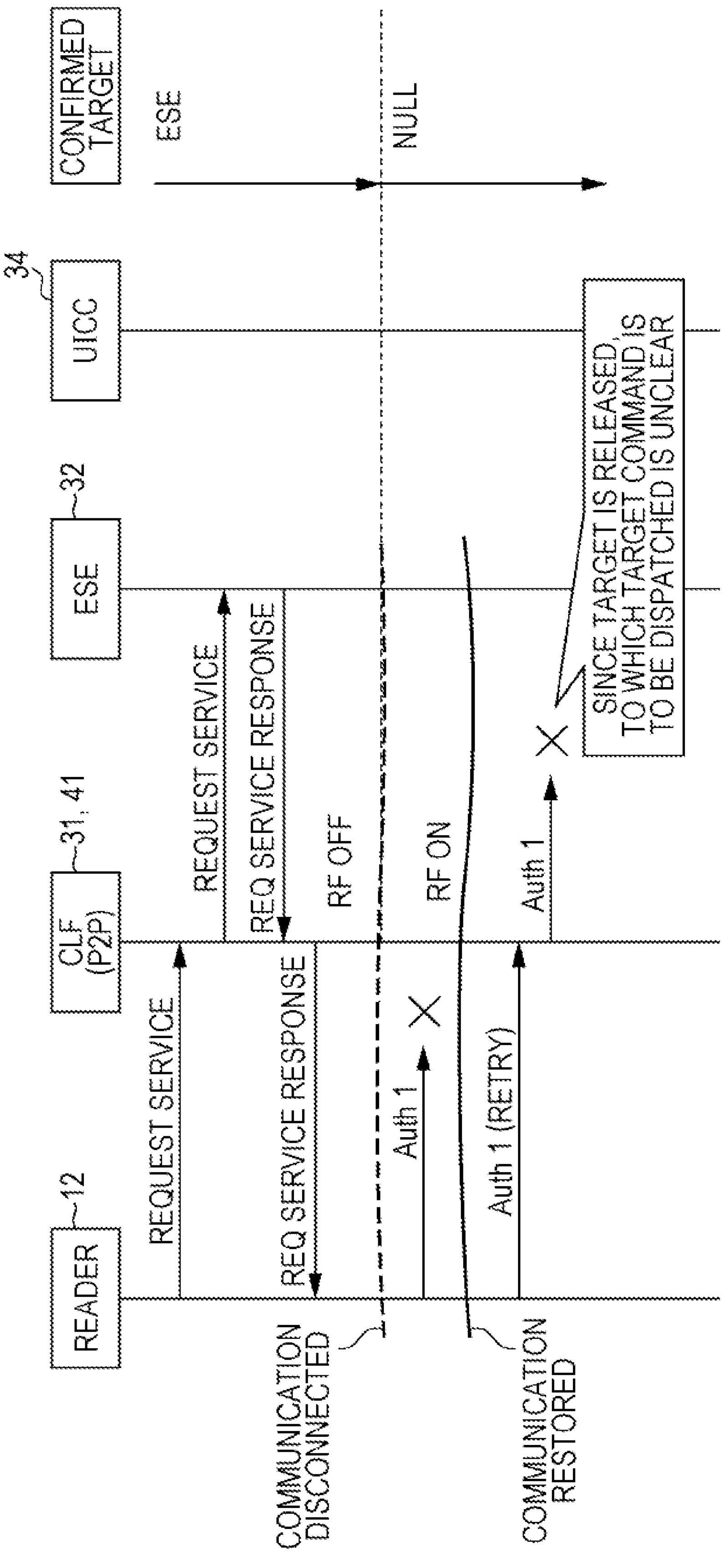
FIG. 17 is a sequence diagram illustrating a case in which an RF signal is lost and is then restored.

As illustrated in FIG. 17, if an RF signal is lost during a near-field communication between the NFC reader 12 and the CLF 31 and the release processing is performed, when the near-field communication between the NFC reader 12 and the CLF 31 is restored later on, with which target the communication is to be performed is unclear for the CLF 31 since the confirmed target has been released.

Accordingly, in the polling-reception release system, in order to enable the reconnection after the loss of the RF signal, the confirmed target is not released at the time of the loss of the RF signal, and instead, after the loss of the RF signal, the confirmed target is released at the time of reception of a next polling command from the NFC reader 12. When the command received after the loss of the RF signal is not a polling command, processing for a route before the loss of the RF signal, i.e., processing for the same target as the target before the loss of the RF signal is maintained.

In the polling-reception release system, it is possible to enable the reconnection after the loss of the RF signal. When the polling-reception release system is employed, there is an advantage in that a simple configuration can be provided since no special circuit is provided for the implementation.

The RLS_REQ-reception release system is a system using an RLS_REQ, which is a command that the NFC reader 12 transmits to completely stop a near-field communication with the CLF 31. Thus, in this system, upon reception of the RLS_REQ, the confirmed target is released. In this case, when the P2P application 41 is confirmed as the confirmed target and the RLS_REQ is received, the CLF 31 releases the P2P application 41 from the confirmed target.

The DSL_REQ-reception release system is a system using a DSL_REQ, which is a command that the NFC reader 12 transmits to deselect (i.e., deactivate) the target. In this system, upon reception of the DSL_REQ, the confirmed target is released. In this case, when the P2P application 41 is confirmed as the confirmed target and the DSL_REQ is received, the CLF 31 releases the P2P application 41 from the confirmed target.

Any target release condition other than the above-described five systems may also be used to release the target. One example of such a target release condition is reception of a command, such as a device reset command for resetting the NFC device 11, defined by various standards.

Next, a flow of release processing executed by the releasing section 103 will be described with reference to a flowchart illustrated in FIG. 18.

In step S81, the releasing section 103 determines whether or not a target release condition that is a predetermined condition for releasing a confirmed target occurs.

Examples of the target release condition include reception of a polling command after loss of an RF signal in the polling-reception release system, reception of the RLS_REQ in the RLS_REQ-reception release system, and reception of the DSL_REQ in the DSL_REQ-reception release system. When such a release condition occurs, the process proceeds to step S82.

In step S82, the releasing section 103 releases the confirmed target confirmed as the communication target, such as the P2P application 41.

Figure 18:
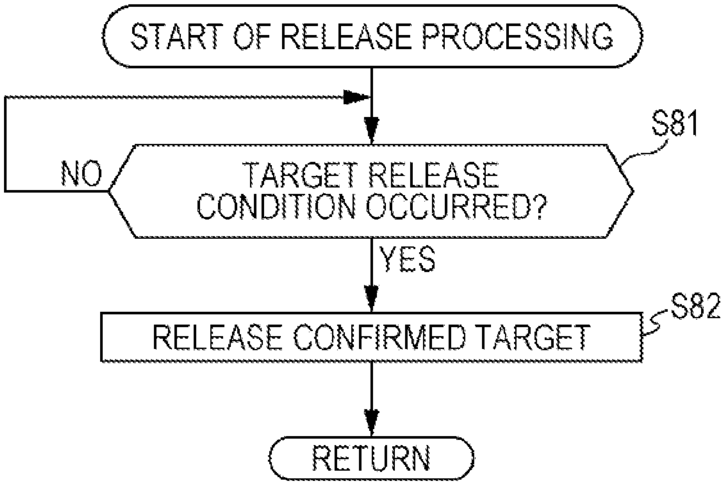
FIG. 18 is a flowchart illustrating a flow of release processing.

When the confirmed target is released, the release processing illustrated in FIG. 18 ends.

As described above, when the release processing is performed using the polling-reception release system, the RLS_REQ-reception release system, or the DSL_REQ-reception release system, for example, it is possible to enable the reconnection after loss of an RF signal.

[Routing State Transition]

Figure 19:
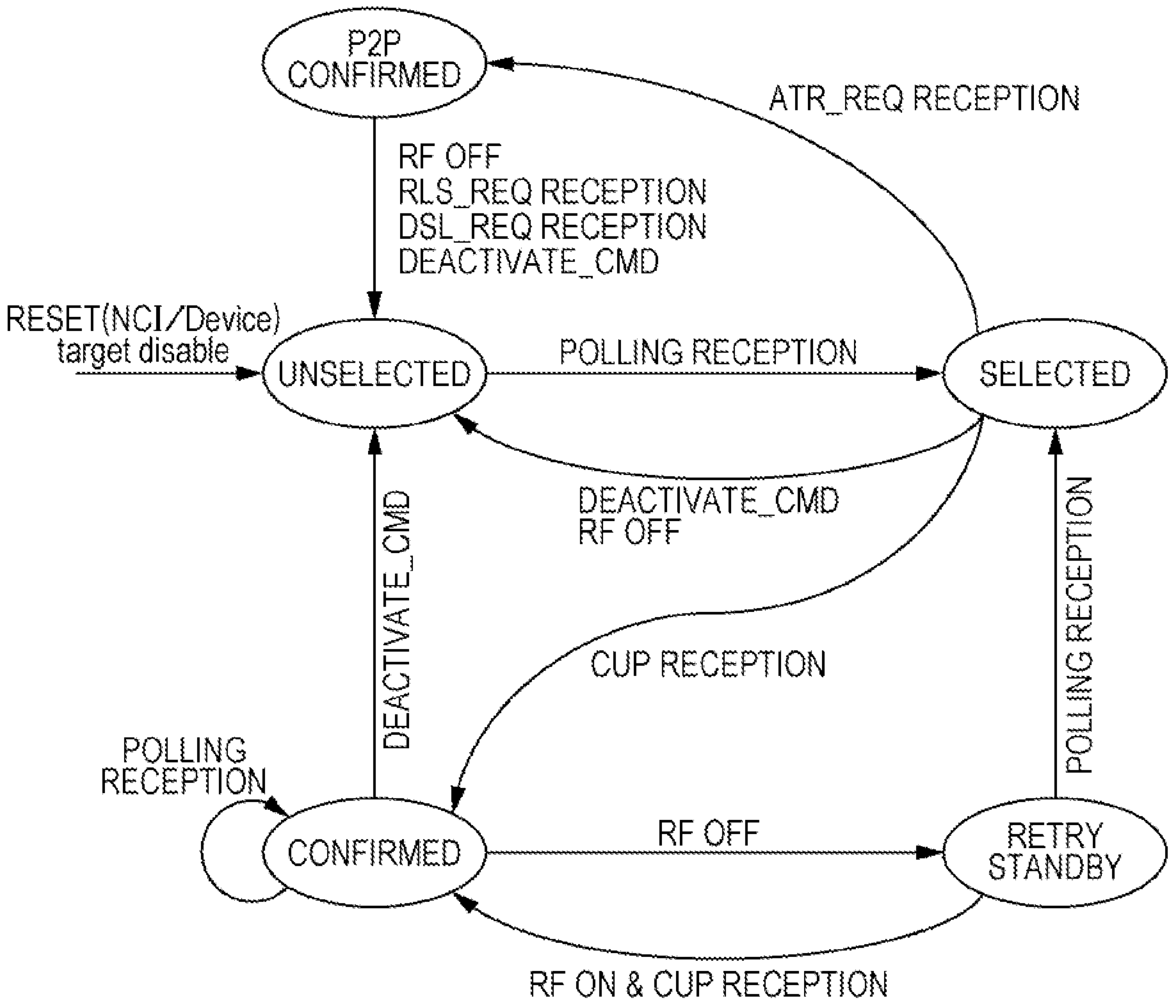
FIG. 19 is diagram illustrating state transition in routing.

FIG. 19 illustrates routing state transition.

In FIG. 19, an "unselected" state represents a state in which no target candidate is selected. A "selected" state represents a state in which a target candidate is selected after a polling command is received from the NFC reader 12. In the "selected" state, when a communication is disconnected and an RF signal is lost or when a predetermined command is received, the state changes to the "unselected" state.

A "P2P confirmed" state represents a state in which the ATR_REQ is received from the NFC reader 12 in the "selected state" and the P2P application 41 is confirmed as a confirmed target. In the "P2P confirmed" state, when an RF signal is lost or when the command RLS_REQ or DSL_REQ is received from the NFC reader 12 or when a DEACTIVATE_CMD, which is a command for requesting a forced-termination of wireless communication processing, is received from the DH 33 for controlling the CLF 31, the state changes to the "unselected" state.

A "confirmed" state represents a state in which a polling command and a command other than the ATR_REQ are received from the NFC reader 12 in the "selected" state and a target other than the P2P application 41 is confirmed as a confirmed target. When a predetermined command is received in the "confirmed state", the state changes to the "unselected" state. When the communication is disconnected and an RF signal is lost in the "confirmed" state, the state changes to a "retry standby" state.

The "retry standby" state represents a state in which a retry is waited for since an RF signal is lost in the "confirmed" state. For example, when an NFC-F command, other than a polling command, is received after restoration of an RF signal in the "retry standby" state, the state changes to the "confirmed" state. When a polling command is received in the "retry standby" state, the state changes to the "selected" state.

As described above, in the routing processing, the state changes to one of the "unselected" state, the "selected" state, the "P2P confirmed" state, the "confirmed" state, and the "retry standby" state, so that one or more target candidates are selected from the multiple targets and a confirmed target is then confirmed. A communication is performed between the confirmed target and the NFC reader 12 until the confirmed target is released.

[Examples of Use Cases]

Figure 20:
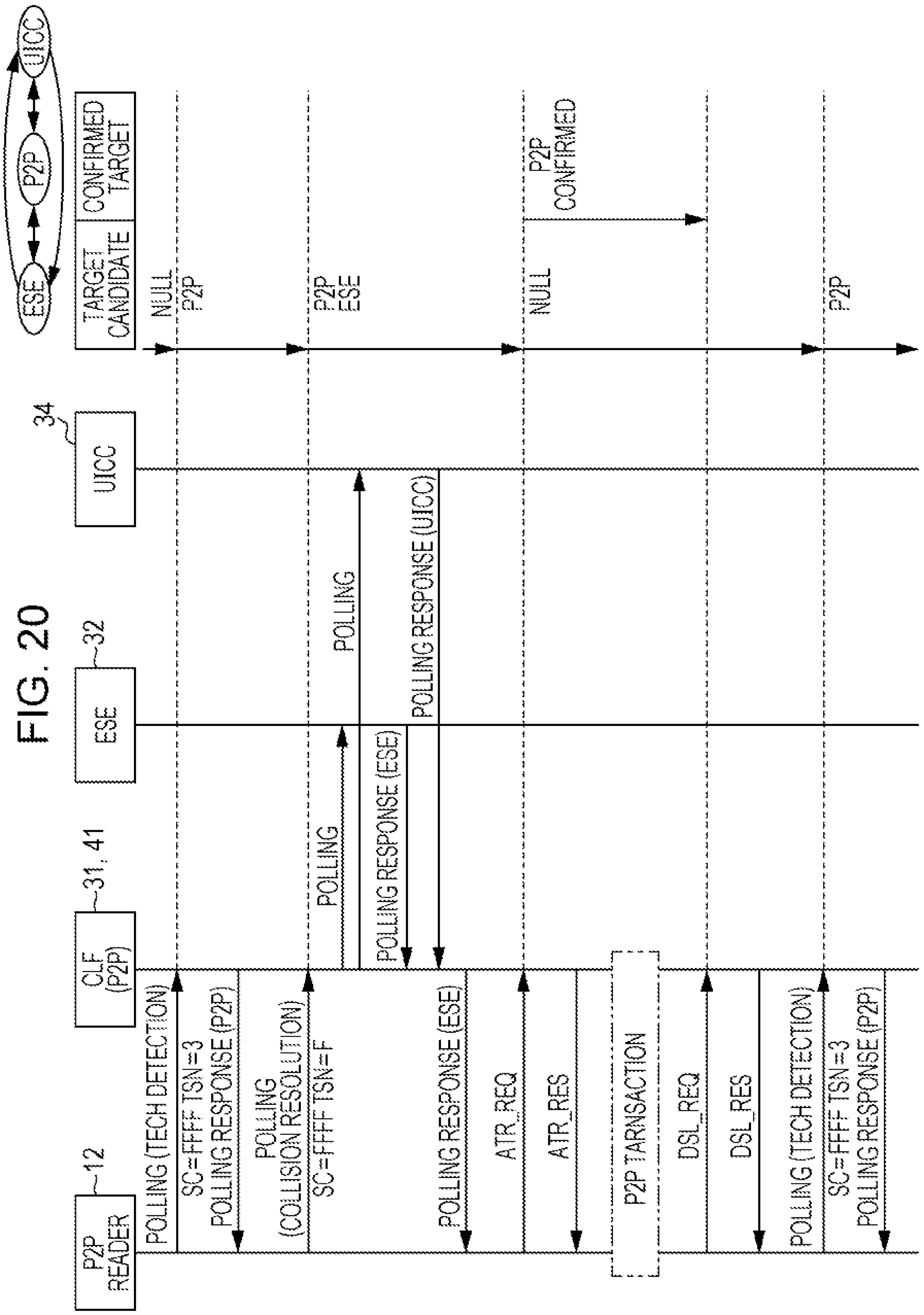
FIG. 20 is a sequence diagram illustrating use case 1.

Use cases 1 to 3 will be described next as specific examples of the above-described routing processing. FIG. 20 is a sequence diagram illustrating use case 1.

Use case 1 is one example of a case in which the NFC reader 12 is a P2P-application-specific reader and the rotation for the target-candidate selection is started at the P2P application 41.

As illustrated in FIG. 20, when a polling command is transmitted from the P2P-application-specific NFC reader 12, the candidate selecting section 101 in the CLF 31 selects the P2P application 41 as a target candidate and transmits a polling response thereof back to the NFC reader 12.

Next, when a polling command is transmitted from the NFC reader 12, the candidate selecting section 101 broadcasts the polling command. The broadcast polling command is received by the ESE 32 and the UICC 34 and responses thereof are sent back to the CLF 31.

In response to the responses from the ESE 32 and the UICC 34, the candidate selecting section 101 selects the ESE 32 as a target candidate and transmits a polling response thereof back to the NFC reader 12. As a result, the P2P application 41 and the ESE 32 are selected as target candidates.

Subsequently, when a command ATR_REQ is transmitted from the NEC reader 12, the confirming section 102 in the CLF 31 confirms the P2P application 41 as a confirmed target and sends back a command ATR_RES. As a result, the P2P-application-specific NFC reader 12 and the P2P application 41 perform predetermined P2P transaction processing via the CLF 31.

Subsequently, when the P2P transaction processing is completed and a command DSL_REQ is transmitted from the NFC reader 12, the releasing section 103 in the CLF 31 releases the P2P application 41 from the confirmed target and sends back a command DSL RES. Thereafter, when a polling command is transmitted from the NEC reader 12 again, the above-described processing is repeated and the P2P application 41 is selected as a target candidate.

As described above, in use case 1, at the stage when the P2P application 41 and the ESE 32 are selected as target candidates in response to the polling performed by the NFC reader 12, the P2P application 41 is confirmed as a confirmed target and the P2P transaction processing is performed. When the P2P application 41 is released from the confirmed target after the P2P transaction processing is completed, the polling by the NFC reader 12 is resumed and the P2P application 41 and the UICC 34 are selected as target candidates.

That is, in use case 1, the P2P-main rotation system including the skip function is used for the target-candidate selection and the targets are selected, for example, in the order of the P2P application 41, the ESE 32, the P2P application 41, and the UICC 34, so that the P2P application 41 is selected once every two times.

Figure 21:
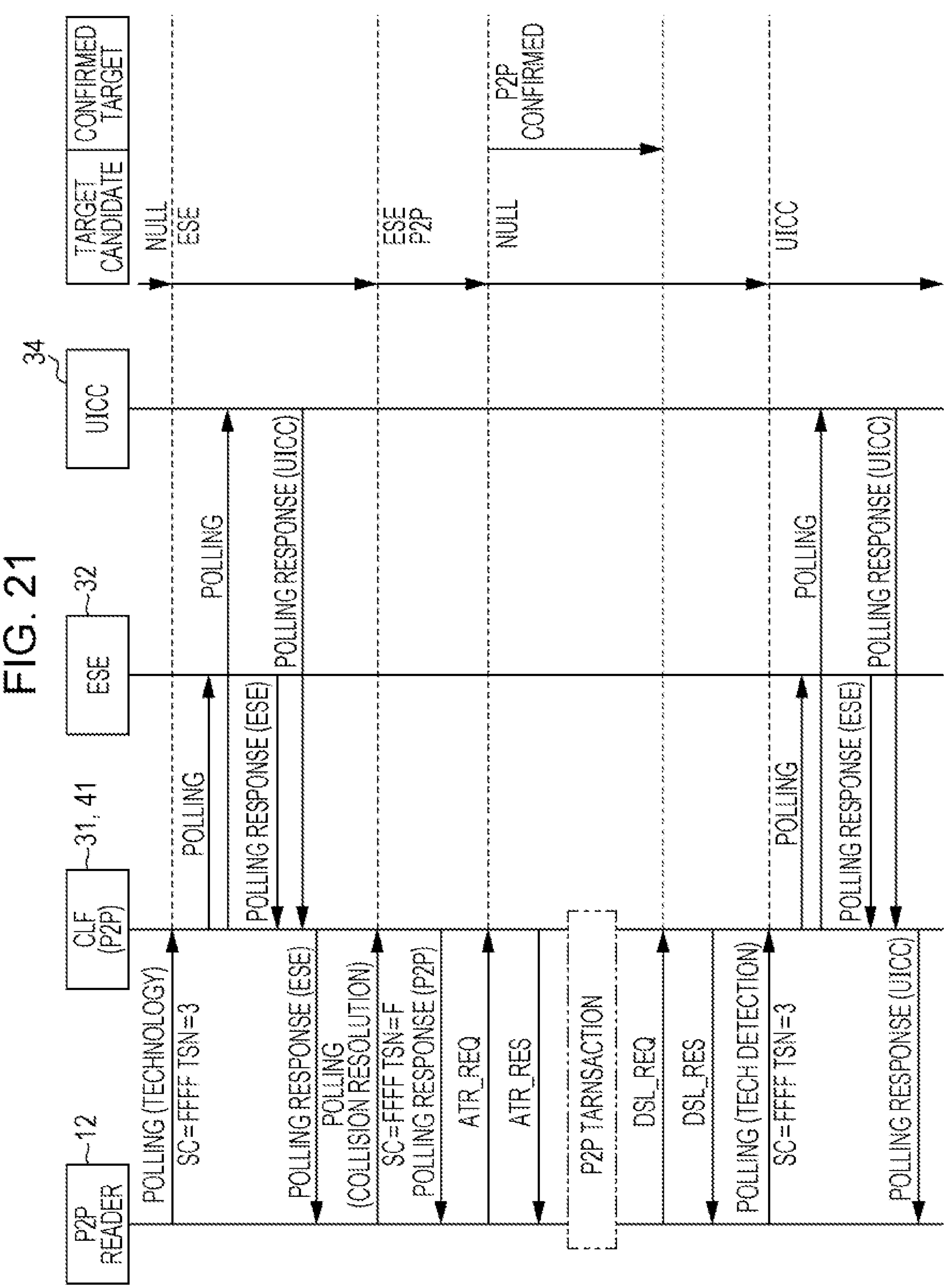
FIG. 21 is a sequence diagram illustrating use case 2.

FIG. 21 is a sequence diagram illustrating use case 2.

Use case 2 is one example of a case in which the NFC reader 12 is a P2P-application-specific reader and the rotation for the target-candidate selection is started at the ESE 32.

As illustrated in FIG. 21, when a polling command is transmitted from the P2P-application-specific NFC reader 12, the candidate selecting section 101 in the CLF 31 broadcasts the polling command. The broadcast polling command is received by the ESE 32 and the UICC 34 and responses thereof are sent back to the CLF 31.

In response to the responses from the ESE 32 and the UICC 34, the candidate selecting section 101 selects the ESE 32 as a target candidate and transmits a polling response thereof back to the NFC reader 12.

Next, when a polling command is transmitted from the NFC reader 12, the candidate selecting section 101 selects the P2P application 41 as a target candidate and transmits a polling response thereof back to the NFC reader 12. As a result, the ESE 32 and the P2P application 41 are selected as target candidates.

Subsequently, when a command ATR_REQ is transmitted from the NFC reader 12, the P2P application 41 is confirmed as a confirmed target. Thus, predetermined P2P transaction processing is performed between the P2P-application-specific NFC reader 12 and the P2P application 41. Upon completion of the P2P transaction processing, a command DSL_REQ is transmitted from the NFC reader 12 and the P2P application 41 is released from the confirmed target.

Next, when a polling command is transmitted from the NFC reader 12, the candidate selecting section 101 broadcasts the polling command and the ESE 32 and the UICC 34 receives the polling command. The UICC 34 is then selected as a target candidate, and a polling response thereof is transmitted back to the NFC reader 12. Thereafter, the P2P application 41 is added as a target candidate and the above-described processing is repeated.

As described above, in use case 2, at the stage when the ESE 32 and the P2P application 41 are selected as target candidates in response to the polling performed by the NFC reader 12, the P2P application 41 is confirmed as a confirmed target and the P2P transaction processing is performed. When the P2P application 41 is released from the confirmed target after the P2P transaction processing is completed, the polling by the NFC reader 12 is resumed and the UICC 34 and the P2P application 41 are selected as target candidates.

That is, in use case 2, the P2P-main rotation system including the skip function is used for the target-candidate selection and the targets are selected, for example, in the order of the ESE 32, the P2P application 41, the UICC 34, and the P2P application 41, so that the P2P application 41 is selected once every two times.

Figure 22:
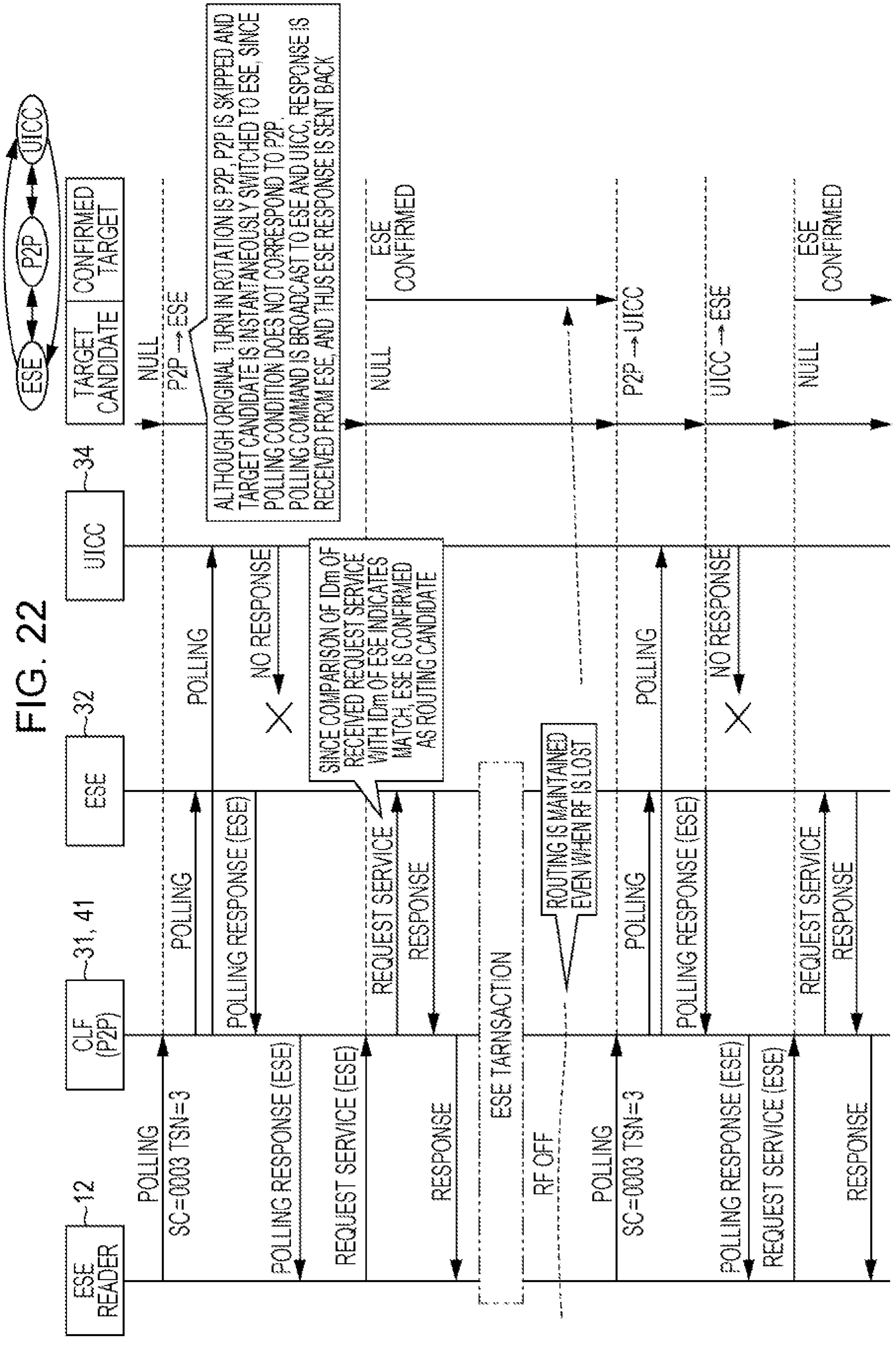
FIG. 22 is a sequence diagram illustrating use case 3.

FIG. 22 is a sequence diagram illustrating use case 3.

Use case 3 is an example of a case in which the NFC reader 12 is an ESE-specific reader and the rotation for the target-candidate selection is started at the P2P application 41.

As illustrated in FIG. 22, when a polling command is transmitted from the ESE-specific NFC reader 12, the candidate selecting section 101 checks the polling parameters in the polling command. Upon determining that the polling is not for the P2P application 41, the candidate selecting section 101 switches the target candidate from the P2P application 41 to the ESE 32. The candidate selecting section 101 in the CLF 31 then broadcasts the polling command.

The broadcast polling command is received by the ESE 32 and the UICC 34. At this point, when a response is received from the ESE 32 and no response is received from the UICC 34, the candidate selecting section 101 selects the ESE as a target candidate and transmits a polling response thereof back to the NFC reader 12. In this case, the IDm of the ESE 32 selected as a target candidate is stored in the memory 31A.

Subsequently, when a non-polling command, such as a request service, is transmitted from the NFC reader 12, the confirming section 102 compares the IDm included in the received command with each IDm stored in the memory 31A. The confirming section 102 confirms the ESE 32 having a matched IDm as a confirmed target and transmits the request service to the ESE 32. When the ESE 32 sends back a response to the request service, the response is then transmitted to the NFC reader 12. As a result, the ESE-specific NFC reader 12 and the ESE 32 perform predetermined ESE transaction processing via the CLF 31.

Thereafter, when an RF signal is lost, the release processing is not performed and the confirmed target is maintained until a predetermined target release condition is satisfied.

When a polling command is transmitted from the NFC reader 12 again, the ESE 32 is released from the confirmed target. The candidate selecting section 101 also checks the polling parameters in the polling command. Upon determining that the polling is not for the P2P application 41, the candidate selecting section 101 switches the target candidate from the P2P application 41 to the UICC 34. When the candidate selecting section 101 broadcasts the polling command, the polling command is received by the ESE 32 and the UICC 34 and a response is sent back from only the ESE 32. Thus, the candidate selecting section 101 selects the ESE 32 as a target candidate and transmits a polling response thereof back to the NFC reader 12.

Subsequently, when a request service is transmitted from the NFC reader 12, the confirming section 102 performs IDm comparison to confirm the ESE 32 having a matched IDm as a confirmed target and sends the request service to the ESE 32. A response from the ESE 32 is also transmitted to the NFC reader 12. As a result, the ESE-specific NFC reader 12 and the ESE 32 perform predetermined ESE transaction processing via the CLF 31.

As described above, in use case 3, the P2P-main rotation system including the skip function is used for the target-candidate selection. That is, polling parameters are checked at the stage when a target candidate is selected in response to the polling performed by the NFC reader 12, and the ESE 32 or the UICC 34 is selected as a target candidate since the polling condition does not correspond to the P2P application 41. Thereafter, a polling command is broadcast, the ESE 32 that sends back a response is confirmed as a confirmed target, and then ESE transaction processing is performed.

When an RF signal is lost, the confirmed target is also maintained until a predetermined target release condition is satisfied. Thus, the processing can be maintained when a near-field communication between the NFC reader 12 and the CLF 31 is restored.

While the ESE-specific reader has been described in the example of FIG. 22, an operation for a UICC-specific reader is basically the same as the operation for the ESE-specific reader and thus a description of the operation of the UICC-specific reader is omitted herein.

When the P2P-main rotation system including the skip function is employed as described above, one of three or more targets can be selected as a target candidate once every two times. This can ensure that the NFC reader 12 selects a desired target to quickly establish a communication.

In addition, the use of the single-response system can ensure that the NFC reader 12 selects a desired target to quickly establish a communication, without implementation of a special circuit in the CLF (front end) 31.

[Extension of P2P-main rotation System Including Skip Function]

Figure 23:
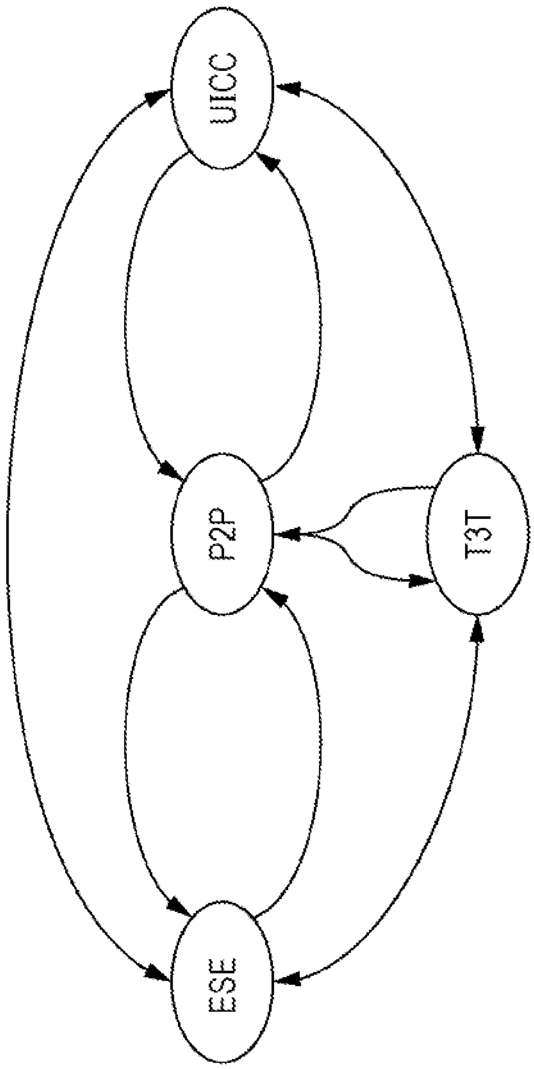
FIG. 23 is a diagram illustrating candidate transition in an extended version of the P2P-main rotation system including the skip function.

FIG. 23 is a diagram illustrating target candidate transition for an extended version of the P2P-main rotation system including the skip function.

In the extended version of the P2P-main rotation system including the skip function, the rotation includes a T3T (type 3 tag) emulation implemented on the DH 33, in addition to the ESE 32, the UICC 34, and the P2P application 41 described above with reference to FIG. 8. In this rotation system, the basic rotation is also the same as the rotation illustrated in FIG. 8, so that the P2P application 41 among the P2P application 41, the ESE 32, the UICC 34, and the T3T, which serve as targets, is selected once every two times.

More specifically, for example, as illustrated in FIG. 23, the rotation is performed in the order of the P2P application 41, the ESE 32, the P2P application 41, the UICC 34, and the P2P application 41, the T3T, and the P2P application 41, with the P2P application 41 being the rotation center. For example, when the polling is not for the P2P application 41, the P2P application 41 is skipped in the rotation and the target candidate is forcibly switched to the ESE 32, the UICC 34, or the T3T, as in the case described above.

Thus, even when the number of targets other than the P2P application 41 increases, the rotation is performed with the P2P application 41 being the rotation center and the P2P application 41 is selected once every two times. This ensures that the NFC reader 12 performs an operation on the P2P application 41.

[Computer to which Present Technology is Applied]

The above-described series of processing may be realized by hardware or software. When the series of processing is realized by software, a program provided by the software may be installed to a general-purpose computer.

Figure 24:
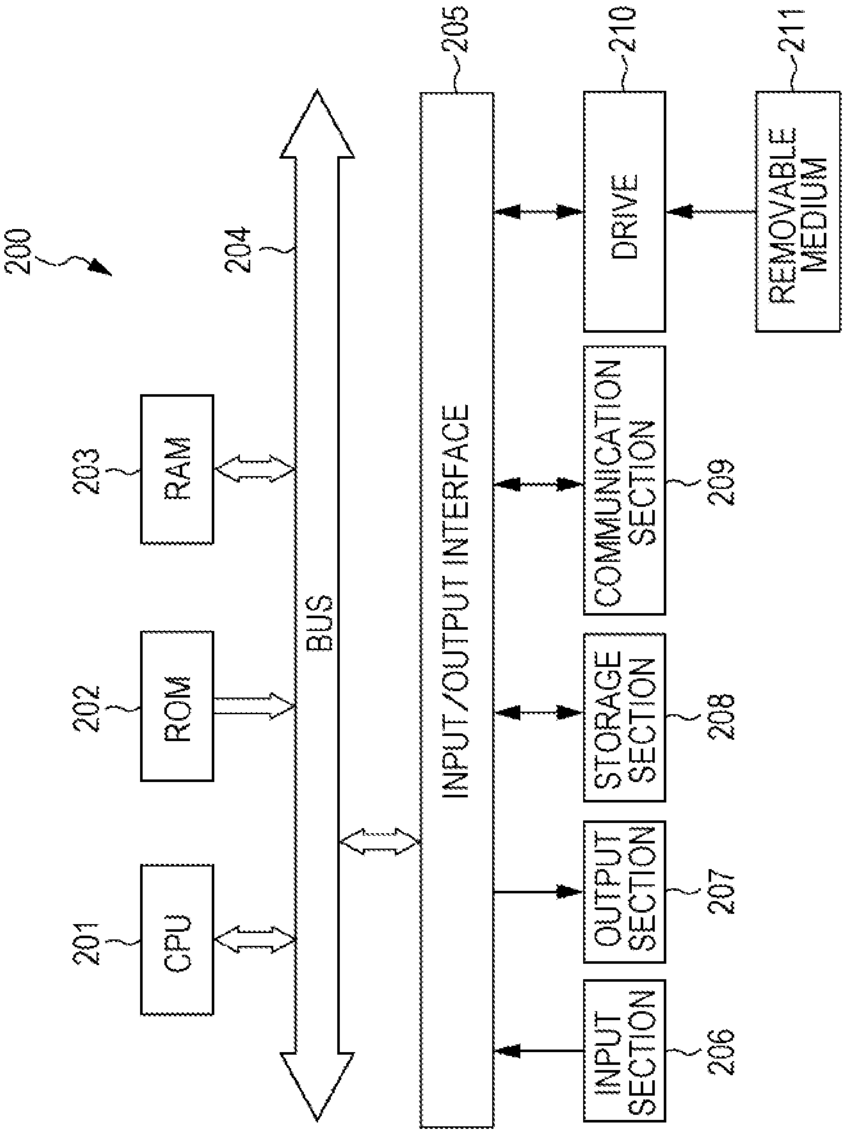
FIG. 24 is a diagram illustrating an exemplary configuration of a computer.

FIG. 24 illustrates an exemplary configuration of one example of a computer to which a program for executing the above-described series of processing is installed.

The program may also be pre-recorded to a storage section 208, such as a hard disk, and/or a ROM (read only memory) 202, which are built into a computer 200.

Alternatively, the program may be temporarily or permanently stored (recorded) on a removable media 211, such as a flexible disk, a CD-ROM (compact disc-read only memory), an MO (magneto optical) disk, a DVD (digital versatile disc), a magnetic disk, or a semiconductor memory. Such a removable media 211 may be supplied as the so-called "packaged software".

Not only is the program installed from the removable media 211 as described above to the computer 200, but also the program may be installed by transferring the program from a download side to the computer 200 through wireless communication via an artificial satellite for digital satellite broadcast or through wired communication over a network, such as a LAN (local area network) or the Internet. In this case, the computer 200 uses a communication section 209 to receive the program transferred in such a manner and can install the program in the storage section 208.

The computer 200 has a CPU (central processing unit) 201 therein. An input/output interface 205 is connected to the CPU 201 through a bus 204. The computer 200 is provided with an input section 206 including a keyboard, a mouse, a microphone, and so on. For example, when a user operates the input section 206 to input an instruction via the input/output interface 205, the CPU 201 executes a program stored in the ROM 202. Alternatively, the CPU 201 loads a program in a RAM (random access memory) 203 and executes the loaded program. Examples of the program include a program pre-stored in the storage section 208; a program transferred through a satellite or network, received by the communication section 209, and installed in the storage section 208; and a program read from the removable media 211, inserted into a drive 210, and installed in the storage section 208. With this configuration, the CPU 201 performs the processing according to the flowcharts described above and the processing realized by the configurations described above and illustrated in the block diagrams. For example, the CPU 201 causes a result of the processing to be output from an output section 207, to be transmitted from the communication section 209, or to be recorded to the storage section 208 via the input/output interface 205, as appropriate. The output section 207 includes an LCD (liquid crystal display), a speaker, and so on.

Herein, processing steps describing the program for causing the computer 200 to perform various types of processing may or may not be time-sequentially performed according to the sequence illustrated in the flowcharts, and also include processing that is executed in parallel or individually (e.g., parallel processing or object-based processing).

The program may also be processed by a single computer or may be processed by multiple computers in a distributed manner. In addition, the program may be transferred to a remote computer for execution.

Embodiments of the present technology are not limited to the above-described embodiment and various changes and modifications can be made thereto without departing from the spirit and scope of the present technology.

In addition, the present technology may be configured as described below.

(1) A communication device, including:

targets that are each configured to execute predetermined processing; and a front end that is configured to select, from the targets, a confirmed target with which an external device is to communicate and that is configured to perform near-field communication with the external device, wherein the front end is configured to select, during transmission of a command for selecting at least one candidate of the confirmed target, a predetermined one of the targets once every two times as a transmission destination of the command.

(2) The communication device according to (1), wherein the front end is configured to broadcast, upon receiving a polling command from the external device, the polling command to the targets other than the predetermined target.

(3) The communication device according to (1) or (2), wherein the predetermined target is a P2P (peer-to-peer) application.

(4) The communication device according to (3), wherein, of the targets, the targets other than the predetermined target include at least one of a secure element and a UICC (universal integrated circuit card).

(5) The communication device according to one of (1) to (4), wherein the front end is configured to confirm the target with which the external device is to communicate, out of the at least one target selected as the at least one confirmed-target candidate, as the confirmed target.

(6) The communication device according to (5), wherein the front end is configured to confirm the confirmed-target candidate as the confirmed target when an identifier of the target selected as the confirmed-target candidate, the identifier being obtained from the target, and an identifier included in a command transmitted by the external device match each other.

(7) The communication device according (5), wherein the front end is configured to confirm the confirmed-target candidate as the confirmed target when a command for confirming, as the confirmed target, the target selected as the confirmed-target candidate is received from the external device.

(8) The communication device according to one of (5) to (7), wherein, the front end is configured to release, on the basis of a predetermined target release condition, the confirmed target from the target with which the external device is to communicate.

(9) The communication device according to (8), wherein, the front end is configured to release, after the near-field communication with the external device is disconnected, the confirmed target upon receiving a polling command from the external device.

(10) The communication device according to (8), wherein the front end is configured to release the confirmed target when a command for terminating a communication between the external device and the confirmed target is received from the external device.

(11) A control method for a communication device including targets that each execute predetermined processing and a front end that selects, from the targets, a confirmed target with which an external device is to communicate and that performs near-field communication with the external device, the control method including:

causing the front end to select, during transmission of a command for selecting at least one candidate of the confirmed target, a predetermined one of the targets once every two times as a transmission destination of the command.

(12) A program for controlling a communication device including targets that each execute predetermined processing and a front end that selects, from the targets, a confirmed target with which an external device is to communicate and that performs near-field communication with the external device, the program causing a computer for the communication device to execute processing including:

selecting, during transmission of a command for selecting at least one candidate of the confirmed target, a predetermined one of the targets once every two times as a transmission destination of the command.

The present disclosure contains subject matter related to that disclosed in Japanese Priority Patent Application JP 2011-176492 filed in the Japan Patent Office on Aug. 12, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device, comprising:

targets that are each configured to execute predetermined processing at the communication device; and a front end that is configured to select, from the targets, a confirmed target with which an external device is to communicate and that is configured to perform near-field communication with the external device, wherein the front end is configured to select, during transmission of and responsive to a polling command for selecting at least one candidate of the confirmed target, a predetermined one target of the targets, wherein the front end is configured to confirm the predetermined one target as the confirmed target with which the external device is to communicate and release the targets other than the predetermined one target, and wherein, when a radio frequency (RF) signal is lost during the near-field communication with the external device, the front end is configured to not release the confirmed target at a time the RF signal is lost and maintain the confirmed target based on a determination of whether a predetermined target release condition is satisfied.

2. The communication device of claim 1, wherein the release of the targets other than the predetermined one target is at a time the near-field communication between the external device and the confirmed target is disconnected.

3. The communication device of claim 1, wherein the front end selects the predetermined one target based on an identifier of the targets.

4. The communication device according to claim 1, wherein the predetermined one target is selected according to a result of a determination of a predetermined parameter indicated in the polling command.

5. The communication device according to claim 1, in which the predetermined target release condition is a next polling command being received, and in which the confirmed target being maintained is released by the front end at a time the next polling command is received.

6. A communication device, comprising:

targets that are each configured to execute predetermined processing at the communication device; and a front end that is configured to select, from the targets, a confirmed target with which an external device is to communicate and that is configured to perform near-field communication with the external device, wherein the front end is configured to select, responsive to a polling command for selecting at least one candidate of the confirmed target, a predetermined target of the targets as a candidate and transmit a command for selecting the at least one candidate of the confirmed target, wherein the front end is configured to confirm the confirmed target with which the external device is to communicate, and wherein, when a radio frequency (RF) signal is lost during the near-field communication with the external device, the front end is configured to not release the confirmed target at a time the RF signal is lost and maintain the confirmed target based on a determination of whether a predetermined target release condition is satisfied.

7. The communication device of claim 6, wherein the front end selects the predetermined target based on an identification of the targets.

8. The communication device according to claim 6, wherein the front end is configured to broadcast, upon receiving the polling command from the external device, the polling command to the targets other than the predetermined target.

9. The communication device according to claim 6, wherein the predetermined target is a P2P (peer-to-peer) application.

10. The communication device according to claim 9, wherein, of the targets, the targets other than the predetermined target include at least one of a secure element and a UICC (universal integrated circuit card).

11. The communication device according to claim 6, wherein the front end is configured to confirm the target with which the external device is to communicate, out of at least one target selected as at least one target candidate, as the confirmed target.

12. The communication device according to claim 6, wherein the front end is configured to confirm the confirmed-target candidate as the confirmed target when an identifier of the target selected as the confirmed-target candidate, the identifier being obtained from the target, and an identifier included in the polling command transmitted by the external device match each other.

13. The communication device according to claim 6, wherein the front end is configured to confirm the confirmed-target candidate as the confirmed target when a command for confirming, as the confirmed target, the target selected as the confirmed-target candidate is received from the external device.

14. The communication device according to claim 6, wherein, the front end is configured to release, on a basis of a predetermined target release condition, the confirmed target from the target with which the external device is to communicate.

15. The communication device according to claim 14, wherein, the front end is configured to release, after the near-field communication with the external device is disconnected, the confirmed target upon receiving a polling command from the external device.

16. The communication device according to claim 14, wherein the front end is configured to release the confirmed target when a command for terminating a communication between the external device and the confirmed target is received from the external device.

* * * * *